US011138063B1

(12) United States Patent
Diao et al.

(10) Patent No.: US 11,138,063 B1
(45) Date of Patent: Oct. 5, 2021

(54) INTEGRATED SYSTEM FAILURE ANALYSIS SOFTWARE TOOLCHAIN (IS-FAST)

(71) Applicant: Ohio State Innovation Foundation, Columbus, OH (US)

(72) Inventors: Xiaoxu Diao, Columbus, OH (US); Carol Smidts, Columbus, OH (US); Chetan Mutha, Arlington, VA (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 16/922,488

(22) Filed: Jul. 7, 2020

(51) Int. Cl.
*G06F 11/07* (2006.01)
*G06F 30/20* (2020.01)

(52) U.S. Cl.
CPC ...... *G06F 11/0793* (2013.01); *G06F 11/0721* (2013.01); *G06F 30/20* (2020.01)

(58) Field of Classification Search
CPC ..... G06F 11/07; G06F 11/079; G06F 11/0793
USPC .......................................................... 714/26
See application file for complete search history.

(56) References Cited

U.S. PATENT DOCUMENTS

| | | | | |
|---|---|---|---|---|
| 5,014,220 A * | 5/1991 | McMann | ............... | G06F 11/008 706/45 |
| 6,654,731 B1 * | 11/2003 | Mahesh | ................ | G06N 5/025 706/45 |
| 7,467,333 B2 * | 12/2008 | Keeton | ................ | G06F 11/261 703/21 |
| 8,532,839 B2 * | 9/2013 | Drees | ..................... | G05B 15/02 700/305 |
| 8,731,724 B2 * | 5/2014 | Drees | ................ | H02J 13/00004 700/276 |
| 8,788,097 B2 * | 7/2014 | Drees | ................ | H02J 13/00016 700/275 |
| 2003/0023413 A1 * | 1/2003 | Srinivasa | ................ | G06F 30/00 703/2 |
| 2007/0050686 A1 * | 3/2007 | Keeton | ................ | G06F 11/261 714/48 |

(Continued)

OTHER PUBLICATIONS

Amin, M. T., Khan, F., & Imtiaz, S. (Feb. 23, 2019). Fault detection and pathway analysis using a dynamic Bayesian network. Chemical Engineering Science, 195, 777-790.

(Continued)

*Primary Examiner* — Kamini B Patel
(74) *Attorney, Agent, or Firm* — Meunier Carlin & Curfman LLC

(57) ABSTRACT

Systems and methods are provided for generating faults and analyzing fault propagation and its effects. Starting from the ontologies of components, functions, flows, and faults, systems and methods are provided that describe, generate and track faults in a computer system across multiple domains throughout design and/or development. In order to construct the system and fault models, a series of concepts is introduced in the form of ontologies and their dependencies. An investigation is performed into the faults, including their type, cause, life-cycle aspects, and effect. Principles and rules are created to generate various faults based on system configurations. After the modeling process, a simulation engine is described to execute actions and simulate the process of fault generation and propagation. As a result, fault paths that impact components and functions can be obtained.

16 Claims, 18 Drawing Sheets

(56) References Cited

U.S. PATENT DOCUMENTS

| | | | | |
|---|---|---|---|---|
| 2011/0061015 | A1* | 3/2011 | Drees | H02J 13/0062 |
| | | | | 715/771 |
| 2012/0022698 | A1* | 1/2012 | Mackay | G06Q 10/06 |
| | | | | 700/275 |
| 2013/0080372 | A1* | 3/2013 | Ho | G06N 5/02 |
| | | | | 706/50 |
| 2014/0142760 | A1* | 5/2014 | Drees | H02J 13/00002 |
| | | | | 700/275 |
| 2017/0286204 | A1* | 10/2017 | Dibowski | G06F 11/0772 |
| 2018/0075192 | A1* | 3/2018 | Sethumadhavan | G06F 16/21 |
| 2019/0266506 | A1* | 8/2019 | Feldman | G06F 40/279 |

OTHER PUBLICATIONS

Avizienis, A., Laprie, J.-C., & Randell, B. (2004). Dependability and its Threats: A Taxonomy. Building the Information Society: Proc. IFIP 18th World Computer Congress, Aug. 22-27, 2004, Toulouse, France. doi:10.1.1.1.5946.

Avižienis, A., Laprie, J. C., Randell, B., & Landwehr, C. (2004). Basic concepts and taxonomy of dependable and secure computing. IEEE Transactions on Dependable and Secure Computing, 1(1), 11-33.

Bany Hamad, G., Hasan, S. R., Ait Mohamed, O., & Savaria, Y. (2015). Characterizing, modeling, and analyzing soft error propagation in asynchronous and synchronous digital circuits. Microelectronics Reliability, 55(1), 238-250.

Bernaras, A., Laresgoiti, I., Bartolome, N., & Corera, J. (1996). Ontology for fault diagnosis in electrical networks. In Proceedings of the International Conference on Intelligent Systems Applications to Power Systems, ISAP, pp. 199-203.

Bo Yang, Grandhi, S., Spagnol, C., Popovici, E., & Cotofana, S. (2016). An Approach for Digital Circuit Error / Reliability Propagation Analysis based on Conditional Probability. In 2016 27th Irish Signals and Systems Conference (ISSC), IEEE, pp. 1-6.

Brüning, S., Weißleder, S., & Malek, M. (2007). A fault taxonomy for service-oriented architecture. Proceedings of IEEE International Symposium on High Assurance Systems Engineering, 367-368.

De Moura, L., & Bjørner, N. (2008). Z3: An efficient SMT Solver. Lecture Notes in Computer Science (Including Subseries Lecture Notes in Artificial Intelligence and Lecture Notes in Bioinformatics), 4963 LNCS, 337-340.

Deborah L. McGuinness, Frank van Harmelen. (2004). Owl web ontology language overview. W3C Recommendation 10.2004-03, Feb. 2004, 1-12.

Diao, X., Zhao, Y., Pietrykowski, M., Wang, Z., Bragg-Sitton, S., & Smidts, C. (Mar. 7, 2018). Fault propagation and effects analysis for designing an online monitoring system for the secondary loop of the nuclear power plant portion of a hybrid energy system. Nuclear Technology, 202(2-3), 106-123.

Dibowski, H., Holub, O., & Rojííček, J. (2017). Knowledge-Based Fault Propagation in Building Automation Systems. Proceedings—SIMS 2016: 2nd International Conference on Systems Informatics, Modelling and Simulation, 124-132.

Espinosa, J., Hernandez, C., & Abella, J. (2015). Characterizing fault propagation in safety-critical processor designs. Proceedings of the 21st IEEE International On-Line Testing Symposium, IOLTS 2015, 144-149.

Gabbar, H. A., & Boafo, E. K. (2016). FSN-based cosimulation for fault propagation analysis in nuclear power plants. Process Safety Progress, 35(1), 53-60.

Gangemi, A., Guarino, N., Masolo, C., & Oltramari, A. (2003). Sweetening Wordnet with Dolce. AI Magazine, 24(3), 13.

Gao, J., Key, S., & Sys, M. (2008). Fault Propagation Analysis for Complex System Based on SmallWorld Network Model. In Reliability and Maintainability Symposium, 2008. RAMS 2008. Annual, pp. 0-5.

Habermaier, A., Leupolz, J., & Reif, W. (2016). Unified simulation, visualization, and formal analysis of safety-critical systems with S#. In Lecture Notes in Computer Science (including subseries Lecture Notes in Artificial Intelligence and Lecture Notes in Bioinformatics), vol. 9933 LNCS, pp. 150-167.

Hu, J., Zhang, L., Cai, Z., Wang, Y., & Wang, A. (2015). Fault propagation behavior study and root cause reasoning with dynamic Bayesian network based framework. Process Safety and Environmental Protection, 97, 25-36.

Hummer, W. (2012). Deriving a Unified Fault Taxonomy for Event-Based Systems Categories and Subject Descriptors. In Proceedings of the 6th ACM International Conference on Distributed Event-Based Systems, pp. 167-178.

Kitamura, Y., & Mizoguchi, R. (1999). An Ontological Analysis of Fault Process and Category of Faults. Proc. of Tenth International Workshop on Principles of Diagnosis (DX-99), 118-128.

Kurtoglu, T., & Johnson, S. (2008). Integrating system health management into the early design of aerospace systems using functional fault analysis. 2008 Prognostics and Health Management Conference, 1-11.

Lackovic, M., Talia, D., Tolosana-Calasanz, R., Bañares, J. A., & Rana, O. F. (2010). A taxonomy for the analysis of scientific workflow faults. Proceedings—2010 13th IEEE International Conference on Computational Science and Engineering, CSE 2010, 398-403.

Landman, R., & Jamsa-Jounela, S. L. (Jul. 17, 2018). Fault Propagation Analysis by Implementing Nearest Neighbors Method Using Process Connectivity. IEEE Transactions on Control Systems Technology, pp. 1-10.

Lauer, C., German, R., & Pollmer, J. (2011). Fault tree synthesis from UML models for reliability analysis at early design stages. ACM SIGSOFT Software Engineering Notes, 36(1), 1.

Liang, Z., Parlikad, A. K., Srinivasan, R., & Rasmekomen, N. (2017). On fault propagation in deterioration of multi-component systems. Reliability Engineering and System Safety, 162(Dec. 2016), 72-80.

Morozov, A., & Janschek, K. (2014). Probabilistic error propagation model for mechatronic systems. Mechatronics, 24(8), 1189-1202.

Morozov, A., Mutzke, T., Ren, B., & Janschek, K. (Jan. 22, 2018). AADL-Based Stochastic Error Propagation Analysis for Reliable System Design of a Medical Patient Table. Proceedings—Annual Reliability and Maintainability Symposium, Jan. 2018, 1-7.

Mutha, C., Jensen, D., Tumer, I., & Smidts, C. (2013). An integrated multidomain functional failure and propagation analysis approach for safe system design. Artificial Intelligence for Engineering Design, Analysis and Manufacturing, 27(04), 317-347.

Mutha, C., & Smidts, C. (2011). An early design stage UML-based safety analysis approach for high assurrance software systems. 13th IEEE International Symposium on High Assurance Systems Engineering, HASE 2011, 202-211.

Niles, I., & Pease, A. (2001). Towards a Standard Upper Ontology. The 2nd International Conference on Formal Ontology in Information Systems (FOIS-2001), 2-9.

Noy, N. (2004). Semantic integration: a survey of ontology-based approaches. SIGMOD Rec., 33(4), 65-70.

Smith, B. (1998). Basic concepts of formal ontology. Formal Ontology in Information Systems. IOS Press, 19-28.

Tumer, I., & Smidts, C. (2011). Integrated design-stage failure analysis of software-driven hardware systems. IEEE Transactions on Computers, 60(8), 1072-1084.

Wallace, M. (2005). Modular architectural representation and analysis of fault propagation and transformation. Electronic Notes in Theoretical Computer Science, 141(3), 53-71.

Yang, Z. (2015). Fault Propagation Characteristics Analysis for Largescale Electronic System by Hierarchical Signed Directed Graph. In IEEE AUTOTESTCON, 2015.

Zhou, A., Yu, D., & Zhang, W. (2015a). A research on intelligent fault diagnosis of wind turbines based on ontology and FMECA. Advanced Engineering Informatics, 29(1), 115-125.

Zhou, C., Huang, X., Naixue, X., Qin, Y., & Huang, S. (2015b). A class of general transient faults propagation analysis for networked control systems. IEEE Transactions on Systems, Man, and Cybernetics: Systems, 45(4), 647-661.

* cited by examiner

```
For component_i in list_unexecuted_components
    Execute_Rules(component_i)

Func Execute_Rules (component)
    State_x = get_current_state (component)
    Rules = get_rules(component, State_x)
    Result = Solver_inject_rules(Rules)
    Remove_component (list_unexecuted_components, component)
    If Result == Unsatisfiable Then:
        Throw Execution_Error
    Check_Related_Components(component)
```

```
Func Check_Related_Components(component)
    For input_m in inputs of component
        For component_c in components connected to input_m
            If component_c is not component_i Then:
                Check_State (component_c)
    For output_n in outputs of component_i
        For component_d in components connected to output_n
            If component_d is not component_i Then:
                Check_State (component_d)
```

```
Func Check_State (component)
   For State_x in States of component
      Rules = get_condition_rules(component, State_x)
      Result = Solver_check_rules(Rules)
      If Result == Valid Then:
         Set_State (component, State_x)

Func Set_State (component, state):
   Execute_rules (component, state)
```

INTEGRATED SYSTEM FAILURE ANALYSIS SOFTWARE TOOLCHAIN (IS-FAST)

STATEMENT OF GOVERNMENT SUPPORT

This invention was made with government support under DE-AR0000976 awarded by the Department of Energy (DOE). This invention was made with government support under DE-AC07-051D14517 awarded by the Department of Energy (DOE). This invention was made with government support under FA-9550-08-1-0139 awarded by the Air Force Office of Scientific Research (AFOSR). The government has certain rights in the invention.

BACKGROUND

A safety-critical system is an integrated system whose failure would lead to catastrophic consequences, such as human death or environmental hazards. Thus, traditional safety-critical systems are usually implemented by a specific single-task system with certifiable reliability and safety standards. However, the increasing number of task requirements have dramatically increased the scale and complexity of safety-critical systems. Computer systems, an integration of hardware and software with multiple functionalities, are widely used, and the faults present in them have brought about new challenges to system reliability and safety. These challenges are reflected in the following aspects.

The properties of faults are diverse and distinct in different domains. A typical computing system consists of a physical platform, an operating system (OS), and multiple user programs. The faults of the physical platform are related to environmental stress and component degradation with service time. Whereas software will not degrade physically, the faults of the operating system and user programs are related to requirements, software structure, logic, and inputs.

The triggering conditions for faults are complex. System faults can be activated by multiple conditions such as the properties of components, components' inner structures, working environments, timing aspects, etc. For example, buffer overflow, data race, and other types of software faults may be created in an immature multitasking program and activated at a specific point in time with particular input data and hardware configurations.

The fault propagation paths are sophisticated, especially when the effects of the faults propagate across hardware and software domains. The problem of fault propagation may occur in, for example, computer system architectures where user programs are usually assigned dynamically to unpredictable memory spaces or other physical resources.

In summary, faults may occur under complex conditions (e.g., specific inputs and states) and pass through various types of hardware and software components to cause functional failure. The impacts of potential faults on system reliability and safety are usually not fully considered and consequently lead to unexpected outages of services delivered by such systems. To overcome these problems, a number of domain-specific methods have been proposed, such as methods for the power domain (Zhou et al. 2015b) (Diao et al. 2018), for electro-mechanical systems (Tumer & Smidts 2011), and for software systems (Wallace 2005).

In the past, researchers have concentrated on specific factors to analyze or assess the characteristics of faults. Some of these factors include specific system structure (Gao et al. 2008) and time (Habermaier et al. 2016). Further, studies (Mutha & Smidts 2011) (Mutha et al. 2013) for solving the interdisciplinary problem of fault propagation analysis have been proposed. These methods allow for a comprehensive analysis of system level requirements and give designers a way to analyze potential functional failure propagation paths in their design. However, these methods are not a good fit for complex systems where analysis of faults requires knowledge spanning many disciplines (e.g., fault analysis for a reactor control system would require using knowledge from science and technology, mechanical engineering, software engineering, control theory, etc.). Also, the existing methods abstract away the computing platform (computer hardware and operating system) and do not account for failures of the computer hardware and their potential impact on application functionality. Consequently, there is still a need for a method to emulate fault propagation for safety-critical systems which would allow consideration of the multi-disciplinary aspects of fault propagation.

Fault analysis at the design stage, which can effectively predict possible system failures before implementation, provides useful information to the system designer for establishing a fault tolerance mechanism and increasing the reliability and robustness of the system. However, existing fault analysis suffers from the following challenges when analyzing computer systems.

Many of the existing fault analysis methods are domain-specific, such as methods for the hardware domain, the software domain, or the time domain. To achieve a wide range of fault coverage, several analysis methods need to be performed, which is time-consuming for system analysis.

It is hard to manage and reuse historical data. Each domain-specific analysis method uses its own approach to model and organize the knowledge base. Knowledge and experience cannot be shared when analyzing complex faults that relate to multiple domains. Moreover, conventionally there is a lack of automation and fault generation and injection are usually based on expert experience.

SUMMARY

Systems and methods are provided that generate various types of faults and evaluate their impacts on the system functionalities at the early design stage of safety-critical systems. These systems and methods can construct analytical models for the system under analysis, generate faults, simulate fault propagations, and evaluate fault impacts. The systems and methods can be applied to various safety-critical industries, such as energy and power grid, involving the design of safety-critical systems.

In an implementation, a method for generating a fault comprises creating a knowledge base comprising at least one of components, flows, or functions; creating a system model using ontological concepts of at least one of components, flows, or functions; and generating at least one system model with at least one fault by applying fault generation principles to the system model.

In an implementation, a system for analyzing fault propagation comprises a knowledge base; and a fault analysis tool implemented using a computing device, wherein the fault analysis tool is configured to receive inputs comprising a plurality of ontologies from the knowledge base, and a system configuration, and wherein the fault analysis tool is further configured to provide outputs comprising at least one fault generation result and at least one analysis result.

In an implementation, a fault analysis tool is provided and comprises a fault generator configured to generate system configurations with injected faults from an original configuration, based on fault generation principles and fault ontologies; and a simulation executor configured to perform fault simulation and infer the states of components and functions during system operation.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 15 shows an implementation of an algorithm of simulation in time steps;

FIG. 16 shows an implementation of an algorithm for checking states of related components;

FIG. 17 shows an implementation of an algorithm for checking and setting the state of a component.

DETAILED DESCRIPTION

Figure 1:
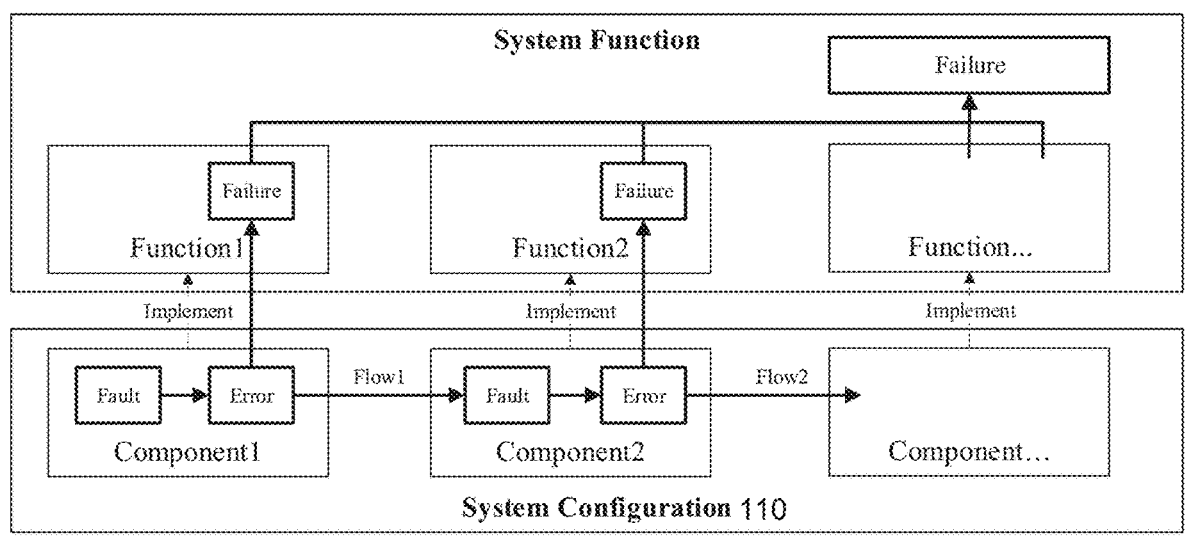
FIG. 1 is a diagram of a fault propagation path.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

An ontology-based approach to perform fault analysis for computer systems used in safety-critical domains is provided. The ontological framework allows the approach to perform fault generation and simulation even at an early design stage. The result of the simulation can assist in the verification of system robustness and identify the effectiveness of designed safety mechanisms without detailed design information. The ontological concepts of entities involved in the fault analysis, such as component, function, flow, and fault, are described. Then, system dynamics, which are appropriate approximations of relations between inputs and outputs of components and flows, are represented by behavioral rules and functional failure logics in terms of the ontological context. This information is used to deduce the states of components and functions of the system. Systems and methods are provided that perform fault simulation for safety-critical systems. Based on the ontological models, the systems and methods can perform fault analysis by generating faults and automatically inferring the potential effects. The systems and methods can estimate the fault propagation path through software and hardware components, and can effectively predict fault impacts on computer system functionalities. The systems and methods can provide system developers with beneficial information on potential system failures to improve system robustness and verify the effectiveness of fault tolerance mechanisms As described further herein, ontological methods are proposed to model, generate, and analyze faults including their activation, propagation, and termination, as well as their effects on functionality. Without implementation details of the system under analysis (SUA), the methods provided herein allow system designers to observe system responses under nominal and faulty states even at the early design stage and to effectively evaluate the robustness of the system under development before its implementation. Furthermore, the methods can efficiently predict the effects caused by one or more faults, as opposed to numerical models of system behaviors whose computation is time-consuming or even infeasible. The proposed methods use ontological theories to construct integrated models which describe system functions, architectures, and activities. Based on the taxonomies for fault, a fault ontology is provided for fault description and generation in computing systems. The fault analysis process is conducted and performed by a simulation engine.

A consistent integrated modeling method for representing the structure, behavior, and functionality of safety-critical computer systems is provided, along with domain-specific ontologies for representing the faults and corresponding impacts in the fields of computer architecture, operating system, and user applications. Several fault generation rules are provided that can be applied to the ontological models to generate variant types of faults and to automatically inject the generated faults into the SUA. An integrated analysis of fault propagation accomplished through the simulation of fault generation, propagation, and detection is described. This is done to determine the fault path and to perform functional failure analysis.

Regarding fault analysis methods, ideally, all faults in a safety-critical system should be avoided or corrected before the deployment of such systems. Researchers have made significant efforts to discover and forecast the effects of faults. These studies are categorized into model-based and data-based methods. Model-based methods use the background knowledge from the analyzed system (e.g., structures, predescribed states, expected behaviors) to predict the responses of the system when one or more faults occur. On the other hand, data-based methods usually do not require "inside information" for the analyzed systems. They employ the sampled data gathered from the system during the occurrence of faults and calculate the probabilities of possible consequences. Data-based analyses, such as Conditional Probabilistic Analysis (Bo Yang et al. 2016), Markov Chains (Liang et al. 2017) (Morozov & Janschek 2014), Dynamic Bayesian Networks (Hu et al. 2015) (Amin et al. 2019), and the Small World Model are deeply dependent on their input data (probability of fault occurrence) and therefore cannot be applied at the design stage.

Because of the diversity and complexity of fault properties and the limited capability of the models used for fault analysis, model-based methods are generally domain specific. In the past, researchers attempted to solve the fault detection and evaluation issues in the domains where faults are generated.

Along with the development of studies in fault recognition and detection, the fact that many faults are caused by multiple factors across multiple disciplines has been discovered and proven, especially in contemporary complex systems. To analyze this type of fault, several interdisciplinary models have been developed and utilized in recent research In the present disclosure, an ontology refers to a specification of a conceptualization. The ontologies described herein are an effective way for information standardization and sharing, and building logical models of systems.

In the present disclosure, ontologies are developed for representing physical objects in the world. Along with the development of ontological theories, upper ontologies are defined to semantically integrate ontologies in different domains. An upper ontology includes terms with common properties in various domains to provide connectivity and interoperability between ontologies in these domains. Existing technologies and ontology theories do not describe ontologies that provide terms and mappings focused on faults and their propagation. In accordance with aspects described herein, a series of notations are provided as primitives of ontology to characterize and constrain the domain-specific ontologies used for fault propagation analysis.

Existing research on fault analysis has engaged in a great number of specific fault investigations and diagnoses in several safety-critical industrial fields, such as power systems, control systems, aerospace, and grid networks. In addition, the characteristics of some general types of faults in a particular domain have been studied, such as deadlock in parallel software and bit flips in memory units. For analyzing complex systems, existing efforts have integrated some portions of software fault analyses into the hardware domain. However, the descriptive capabilities of the models limit these integrations and are thus insufficient to be applied to contemporary computer systems. By taking advantage of ontologies, aspects described herein provide concepts to solve the knowledge description and integration issues involved in fault analysis. Aspects described herein also provide methods to perform fault propagation between various domains.

A fault analysis of the present disclosure basis is now described. In a system, a fault is the cause of an error, which is the deviation of the state of the system under analysis. The error, caused by a fault, may in turn activate another dormant fault and hence lead to another error. Consequently, this process will possibly trigger a function's failure or degradation, which are the events that occur when the function deviates from the nominal states. FIG. 1 is a diagram of a fault propagation path 100.

In FIG. 1, components are the physical or logical objects that represent a system (located at the bottom). A component is an individually functional object (hardware or software) existing in the systems, i.e., each component implements one or more function. Normally, a component may interact with other components during system operation. These interactions are modeled by flows, which represent the travel of objects through components or functions. The travelling objects can be materials, energy, signals, or a combination thereof. The relations between the input and output flows of a component are behaviors of such a component. A component's behaviors are related to their states. The set of components, related flows, and their states is described as a system configuration 110. Faults are the dependent objects which stay in components. When a fault is activated, it will cause a transition of its resident component from a normal state to various abnormal states, known as the occurrence of an error. Since it is in an erroneous state, the behavior of the component will deviate. The deviation can be observed by the input/output flows of the component. The observed deviation can also be used to infer the state of the functions implemented by the host components. In addition, because of the existence of the flows between components, an abnormal behavior of a faulty component may impact another component and activate another fault residing in that component. Subsequently, the activated fault leads to the occurrence of an error in the other component. The activation process will happen in turn and possibly trigger the failure of a system function, which may be related to multiple functions implemented by the components.

In summary, a fault propagation path is a chain expressing the causality relationships between faults, errors, and failures. An example fault propagation path is detailed as steps 1-4 below.

1. A dormant fault was activated by a specific condition (event) and led to an erroneous state of a component.

2. The erroneous state of the component caused a change in the behavior (outputs) of the component.

3. The changed behavior will possibly lead to a failure of the functions implemented by the faulty component, which may be further considered for the judgement of the system failure.

4. The changed behavior of the component will impact its related components via flows, and possibly: a.) trigger a new fault hiding in its related components and then, for each component, go to step 1. b.) change the state of the related component and then, for each component, go to step 2. c.) change the behavior of the related component and then, for each component, go to step 3. d.) does not cause any changes; the propagation path terminates here. The process of fault analysis usually stops when the impacts of a fault reach a functional failure of the system.

Figure 2:
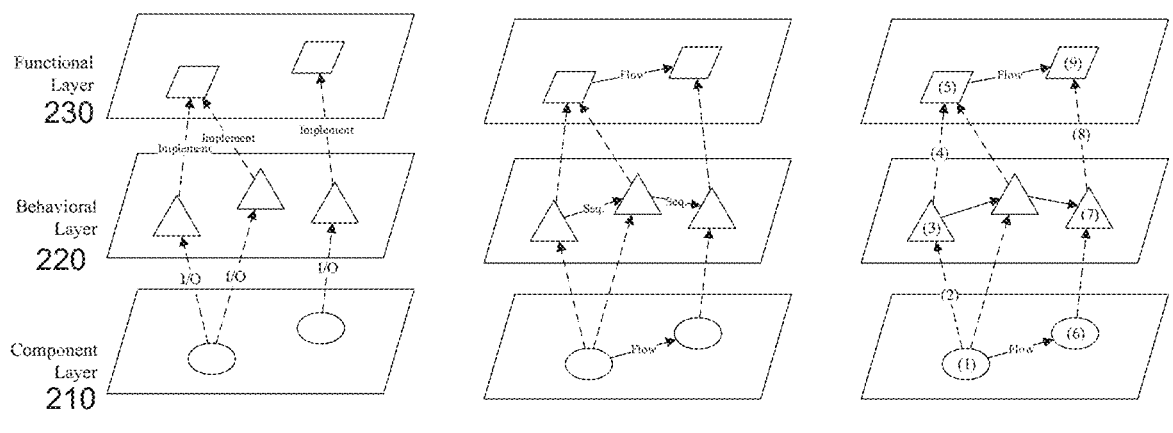
FIGS. 2A, 2B, 2C show diagrams of an example three layered analysis structure with interlayer relations, with interlayer and inner layer relations, and with numbered relations, respectively.

FIGS. 2A, 2B, 2C show diagrams of an example three layered analysis structure with interlayer relations, with interlayer and inner layer relations, and with numbered relations, respectively. With respect to modeling fault propagation, in order to analyze functional failures caused by faults, three layers of views are involved in the fault propagation analysis, including the component layer 210, the behavioral layer 220, and the functional layer 230, as displayed in FIG. 2A. For clarity, differently shaped nodes are used to represent the concepts in each layer.

In detail, an ellipse node in the component layer denotes an individual component. Triangles located at the behavioral layer are the behaviors implemented by these components. The "I/O" links represent the implementation relations between components and behaviors, implying that the behavior of a component can be observed by the inputs and outputs (I/O) of such component. One component may perform multiple behaviors at the same time.

In the functional layer, the parallelograms are the functions of components or the entire system. A function is implemented by the component's behaviors linked to it. For one function, several related behaviors may be required.

In practice, interactions exist between nodes in the same layer. Components may communicate with each other through flows. The behaviors may occur sequentially or in parallel. Several functions are dependent on other functions in a system. These relations are depicted in FIG. 2B. Note that flows are used to model the dependencies between functions at the functional layer because when a function depends on another function, it usually requires the outputs (e.g., materials, signals) from that function, which can be modeled by flows in the framework. Due to this relation, a fault propagation process can be detailed by using the interlayer and inner layer links, as displayed in FIG. 2C.

In FIG. 2C, an example propagation path related to a fault is displayed, in which steps are labeled by numbers. Initially, a fault is activated at a component labeled as step (1). Then, the faulty state of the component alters its output at step (2). The abnormal outputs are observed as an unexpected behavior at step (3). This behavior is used to infer the state of the function at step (4). Based on the inference conditions described in the function, the state of the function can be inferred as failed at step (5). Further, the component anomaly which occurred at step (1) propagates to another component through a flow at step (6). This component in turn behaves abnormally and consequently causes a failure through steps (7) to (9). If the failure at step (9) leads to the failure of a system function, the analysis would stop. The path laid out by steps (1) to (9) is an example of a fault propagation path. As described further herein, several concepts and mechanisms are provided to support generating fault propagation paths for safety-critical computer systems.

Figure 3:
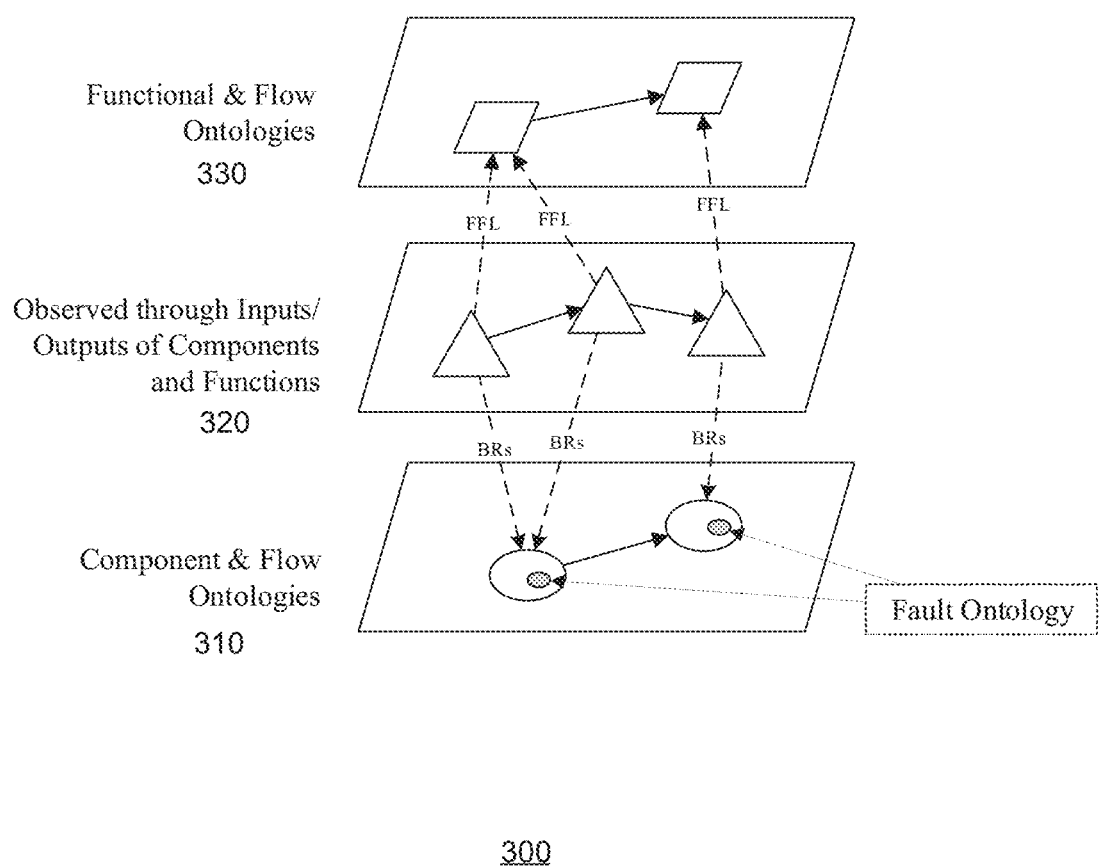
FIG. 3 is a diagram showing relations between ontological concepts.

An ontology is an effective way to represent and share knowledge in different research and practical fields. FIG. 3 is a diagram showing relations between ontological concepts 300. A set of ontologies is described herein to address the fault analysis issues, as shown in FIG. 3.

In FIG. 3, the component and flow ontologies 310 are employed to elicit and express common characteristics of system components and their interactions. Meanwhile, the functional ontology that accompanies the flow ontology 330 provides the capability of describing functions implemented at both the component level and the system level. The behaviors that can be observed through inputs/outputs 320 are described in the component layer and the functional layer. The fault ontology is devoted to representing various types of faults potentially existing in components. These concepts are described further herein.

In order to describe and generate faults and their propagation paths, a hierarchical ontology with four levels is provided corresponding to the ontology definitions mentioned above.

Figure 4:
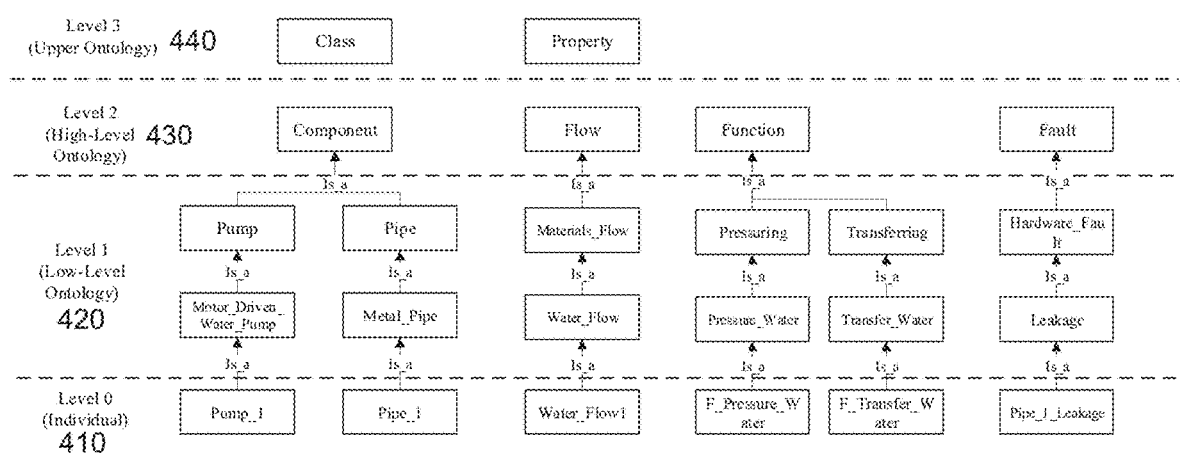
FIG. 4 is a diagram showing an example hierarchy of ontological concepts.

FIG. 4 is a diagram showing an example hierarchy of ontological concepts 400. In the structure, the lowest level (level 0) 410 represents the individual components in an SUA, such as the instance of a motor-driven pump (named "Pump_1"). Level 1 420 includes the concepts and attributes of the individual components in level 0. For example, the concept of a motor-driven pump includes several attributes and characteristics of motor-driven pumps, such as size, power, etc. In level 1, the descendant ontologies will inherit all properties from their parents. Level 2 430 consists of high-level ontologies which are the definitions and attributes of the concepts described in level 1. Four ontological concepts are described at this level, including component ontology, flow ontology, functional ontology, and fault ontology. Then, several low-level ontologies based on these four ontologies are created. The highest level (level 3) 440 are ontologies described to provide the semantic integration of ontologies in several domains.

The ontology (level 3) 440 includes terms as the primitives to describe domain-specific ontologies used in the method of analysis. The concepts of class and property are provided for defining the ontologies in all levels.

Class concerns the existence (being) of a group of objects and describes what a group of things are by distinguishing them from other things in the world. Generally, a class represents an entity in a system. A class usually has an identity property which is assigned a name that represents the essence of the class's attributes. The identity is usually unique in order to avoid confusion in analytical models.

Property is an attribute describing the features that a class possesses to distinguish it from other classes, or to affect other attributes in a particular situation. For example, when trying to trace a system failure hazard that is caused by heat, it may to refer to the highest safe temperature properties of all physical components in such system. Properties include, for example, the "Is_a" relation representing specialization and the identity property "Id" that describes the name of a class. For example, Id(Pump_1)="Pump_1", and Is_a (Pump)=Component.

High-level ontologies, shown as level 2 430 in FIG. 4, are concepts that describe common elements in the fault analysis process. The common elements include component, flow, function, and fault. The ontologies established to denote these elements are described below.

Component ontology is used to model components and the way in which they constitute a new component or system. The process of modeling components include describing the generic attributes of components by using the ontological concepts described herein. Besides the properties derived from level 3 440 (e.g., "Is_a" and "Id"), the following introduce the properties described for components.

"Composed_of" specifies a special relation between components. The set of composites includes the subcomponents that constitute an integrated component. It denotes the significant relationship "owned-by" or "are-part-of" between a component and its compositions. A subcomponent can be physical, logical, or both. A physical subcomponent describes the subcomponent that physically constitutes the current component. A logical subcomponent is usually described for software, such as data structure, functional routines, and control algorithms.

"Domain" specifies a component as software or hardware.

"Location" represents the position relative to other components.

"Inputs" represents the material, energy, or data received from outside of a component. In an embodiment, inputs may be related to one or more types of flows that transfer objects to the current component.

"Outputs" represents the material, energy, or data sent out from the current component. Similarly, outputs may be related to one or more types of flows that transfer objects from the current component to the others.

"Purpose" describes the goal of a component, which can its function.

"Qualities" are the measurable properties that express particular characteristics of the current component. For example, the maximum space of a data buffer, which can be specified. Also, some qualities are described to express the component dynamics during system operation. For instance, the stack occupancy of a running process will vary depending on the states of its execution.

"States" describe various operating conditions belonging to a component. A transition of state describes the evolution of a class in terms of events or time sequence. The state is modeled by an Extended Finite State Machine model in which states are identified by their names, types, triggering conditions, transitions, and a set of behaviors: States($\cdot$)= $\langle$ Name, Type, Conditions, Transitions, Behaviors$\rangle$. Name is an identifier of the current state. Type is typically classified as {Nominal, Faulty}. This collection can be extended by defining particular states for a specific type of components. For instance, the nominal states of a user thread in general operating systems can be running or suspended. The set Conditions represents the condition for entering such state. This set includes predicates that map the elements of States, Inputs, and Outputs to a space of true or false Condition(s, i, o)$\rightarrow$ {True, False}, s$\in$States, i$\in$Inputs, o$\in$Outputs. Then, the result of these conditions are used in "if-then" rules to trigger a transition. The set Transitions includes the transition relations between each state, Transition=$s_i \rightarrow s_j$, $s_i \in$ States, $s_j \in$ States. Behaviors represent the actions that a component takes to generate outputs in relation to its inputs and states, o=Behavior(s, i), s$\in$States, i$\in$Inputs, o$\in$Outputs. During the early phase of system design, no detailed implementation of components or mathematical models representing their behaviors will be available.

Figure 5A:
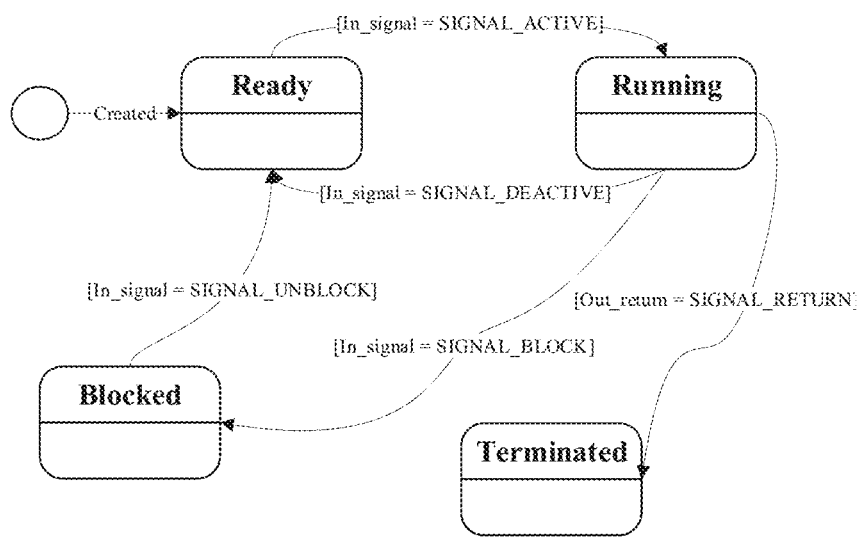
FIGS. 5A and 5B show an example state machine of a process and an example state machine of a pump, respectively.
Figure 5B:
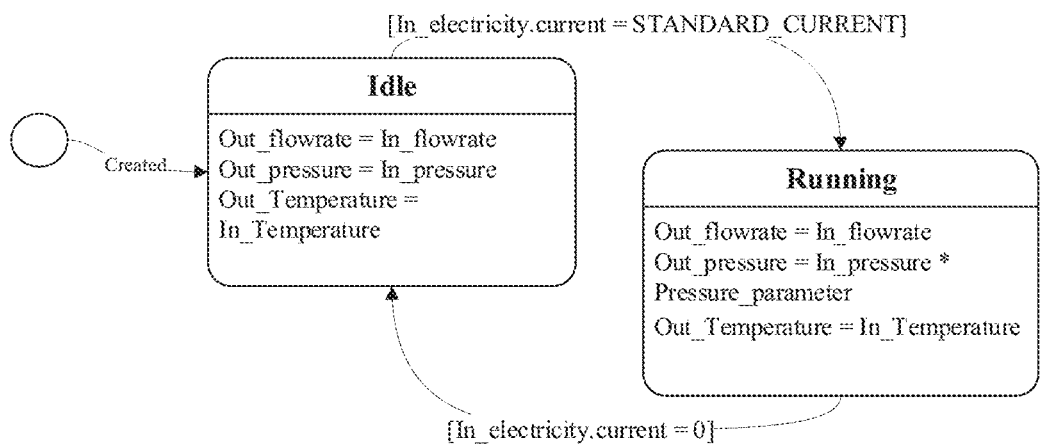

FIGS. 5A and 5B show an example state machine of a process 500 and an example state machine of a pump 550, respectively. FIG. 5A shows the state machine described for a component "process" running in an operating system. It includes several states, such as ready, running, blocked, and terminated. The transition of state will occur when the component receives signals (e.g., SIGNAL_ACTIVE, SIGNAL_DEACTIVE) from the input flow "in_signal" or returns with a "SIGNAL_RETURN" signal. FIG. 5B is the state machine of a pump, which describes not only the states with transitional conditions but also the Behaviors belonging to each state. The information is summarized in Table 1.

TABLE 1

Specific Properties of a Component

| Property Name | Notations | Description |
| --- | --- | --- |
| Composed_of | Composed_of($\cdot$) | Subcomponents |
| Domain | Domain($\cdot$) | Software/Hardware |
| Location | Location($\cdot$) | Position related to other components |
| Inputs | Inputs ($\cdot$) | The input flows |
| Outputs | Outputs($\cdot$) | The output flows |
| Purpose | Purpose($\cdot$) | Functions |
| Qualities | Qualities($\cdot$) | (e.g., Mass, Height, Volume) |
| States | States($\cdot$) | Nominal/Faulty |

To clarify the aforementioned concepts further, a multi-core processor is used as an example component and is modeled by a component ontology derived from these concepts. The component ontology is described further below. In the component model, the processor is composed of arithmetic units, bus interface units, caches, etc.; the processor's domain is hardware; its location includes plugging into a motherboard and connecting with memory and peripheral equipment physically; its inputs and outputs are the commands and data received from and sent to memories and I/Os; the purpose of a processor is to execute a sequence of instructions from an internal perspective or run a control algorithm from an external perspective; the qualities can be the clock frequency, the nominal temperature range; finally, states can include a normal-working state or a low-speed state for energy conservation. As an example of use of the component ontology, the model of a multi-core processor is given in Table 2.

TABLE 2

Component Ontology for a Multi-Core Processor (MCP)
Class: Multi_Core_Processor (MCP)

| Properties | Notations | Property Value |
| --- | --- | --- |
| Is_a | Is_a(MCP) | CPU (Component) |
| Composed_of | Composed_of(MCP) | Core_1, Core_2, . . . |
| Domain | Domain(MCP) | Hardware |
| Location | Location(MCP) | Connected to the Motherboard(Component), Running a user program (Component) |
| Inputs | Inputs(MCP) | Software Commands, Software Data, Memory Data, I/O Data, Interrupts, etc. |
| Outputs | Outputs(MCP) | Memory Address, I/O Address, Memory Data, I/O Data |
| Purpose | Purpose(MCP) | Execute Commands |
| Qualities | Qualities(MCP) | Clock Frequency: Hz/KHz/MHz |
| States | States(MCP) | Nominal (Idle, Reading I/O, Reading Memory, Writing I/O, Writing Memory, Calculating, etc.)/Faulty (see Fault Generation Section) |

Flow ontology describes the transition of materials or signals between components and functions, which are involved in the effect propagation of a fault. Flow is capable of tracking the transit of an object from its source position to its final destination as it weaves through the various components of the system. An example of flows would be the travel of a mouse click signal from a fingertip, into the onboard circuitry of the mouse, then through the universal serial bus (USB) port in the rear of the computer, into the system bus, into the cache and processor pipeline, and finally reaching the processor. Table 3 lists primitives considered in the flow ontology.

TABLE 3

Flow Ontology

| Property Name | Notations | Description |
| --- | --- | --- |
| Type | Type($\cdot$) | Material/Energy/Data |
| Source | Source($\cdot$) | One or more components |
| Sink | Sink($\cdot$) | One or more components |
| Carrier | Carrier($\cdot$) | Material, Conductor, Bus, etc. |
| Qualities | Qualities($\cdot$) | Temperature, Pressure, Altitude, Flowrate, Scale, Size, etc. |

"Type" of a flow can be {Material, Signal, Energy}.

"Sources" are the components which send out the current flow.

"Sinks" are the components which receive the current flow.

"Carriers" are the components which the current flow goes through.

"Qualities" are the measurable properties that express particular characteristics of the current flow. For example, a liquid flow for a power plant includes the properties of temperature, pressure, latency, and carrier (such as a pipe).

By using component and flow ontologies, a theoretical system model can be built to demonstrate the static architecture and the dynamic interactions between each component across hardware and software domains. This model can be extended and detailed through the process of system design and development. Along with the increasing scale and concreteness of component models, more types of component faults are capable of being emulated and greater accuracy of fault analysis results can be obtained.

Functional ontology describes functional knowledge pertaining to corresponding components or systems. Table 4 summarizes the concepts used for describing the functional ontology.

TABLE 4

Functional Ontology

| Property Name | Notations | Description |
| --- | --- | --- |
| Composed_of | Composed_of(·) | Sub-functions of the current function |
| Host Entity | Host_Entity(·) | The component that implements this function |
| Location | Location(·) | Position relative to other functions |
| Inputs | Inputs(·) | The flows received from other functions |
| Outputs | Outputs(·) | The flows sent out from the current function |
| Purpose | Purpose(·) | User Requirements related to the current function |
| Qualities | Qualities(·) | Design value of physical or logical variables |
| States | States(·) | Opemting/Degmded/Lost |

"Composed_of" records the sub-functions of the current function. Sub-functions can be sequential or parallel with synchronization mechanisms implemented by synchronizing components (e.g., mutex lock, semaphore).

"Host Entity" of a function is the component that implements such function.

"Location" represents the position relative to other functions.

"Inputs" represent the type of flows received from outside of a function. Usually, inputs will be related to one or more flows.

"Outputs" represent the type of flows sent out from inside of a function. Usually, outputs will be related to one or more flows.

"Purposes" provide the corresponding requirements. Functional purposes connect failures to user requirements, which are also potentially erroneous in practice.

"States" provides possible states of the current function associated with triggering conditions, States(·)=⟨Name, Type, Conditions⟩, Type∈{Operating, Degraded, Lost}. The Conditions are "if-then" rules in which propositional logics are used to justify the trueness of each state.

For example, the functional ontology of a processor (executing commands) can be described as shown by Table 5.

TABLE 5

Function Ontology of a Processor
Class: Execute_Commands (EC)

| Properties | Notations | Property Value |
| --- | --- | --- |
| Is_a | Is_a(EC) | Function |
| Composed_of | Composed_of(EC) | Read_Commands, Write_IO_Data, etc. |
| Host Entity | Host_Entity(EC) | Processor (Component) |
| Location | Location(EC) | Execute after the function "Read_Command" |
| Inputs | Inputs(EC) | Software Commands, Software Data, Memory Data, I/O Data, Interrupts, etc. |
| Outputs | Outputs(EC) | Memory Address, I/O Address, Memory Data, I/O Data |
| Qualities | Qualities(EC) | Execution_Time (ms, us), etc. |
| Purpose | Purpose(EC) | Requirement x.x Command Execution |
| States | States(EC) | Operating/Degraded/Lost |

The property composed of describes the sub-functions such as reading commands, writing I/O data, etc. The host entity of this function is a processor. The functional location can be after the function "Read_Command", which means that this function will be executed when the function "Read_Command" is done. The inputs and outputs of this function are described as the commands and data related to its host processor. The qualities of this function include its execution time. More qualities can be described when the system designers specify more parameters to this function. The purpose of this function should be mapped to one or more requirements of the system under analysis. The mapping relation between functions and requirements goes beyond the scope of this paper.

The function and flow ontologies allow system developers to build functional models for describing functionalities and establishing relations between components and their functions. Based on ontological concepts, different types of system components, whether physical or logical, can be modeled in a consistent format. Component models and functional models can be integrated into synthetic models seamlessly through the dependencies described below with respect to dependencies and constraints. A fault ontology is described below to describe and analyze faults systematically through the proposed synthetic models.

Fault ontology allows the ontological framework to represent and generate various sorts of faults that may be introduced at design, development, and operation phases. In the perspective of system engineering, an error is "the state of the system that deviates from the correct service state". A fault is described as: "An adjudged or hypothesized cause of an error." System failure is "an event that occurs when the delivered service deviates from correct service". A fault can arise from any phase of the life cycle of a product and can lead to erroneous states that may culminate into failures.

Due to the complexity of fault causes and effects, several properties are used to represent the constraints of fault generation and propagation. Table 6 outlines the properties considered in the provided analysis framework.

TABLE 6

Fault Ontology

| Property Name | Notations | Possible Values |
| --- | --- | --- |
| Host Entity | Host_Entity(•) | The entity where the fault is located in |
| Fault Origin | Fault_Origin(•) | See Fault Origin Taxonomy |
| Phase of Introduction | Phase_of_Introduction(•) | Development or Operation |
| Domain | Domain(•) | Software or Hardware |
| Occurrence | Occurence(•) | Transient, Periodic, or Permanent |
| Fault Category | Fault_Category(•) | Categorized by the Incorrect Properties of Components or Flows. |
| Effects | Effects(•) | Faulty States of Host Entities |
| Impact Direction | Impact_Direction(•) | Upstream, Self, or Downstream |
| States | States(•) | Dormant, Activated, or Terminated |

Host Entity is the entity where the current fault is located. This property constrains the type of the entity (e.g., components or functions) holding the current fault.

Figure 6:
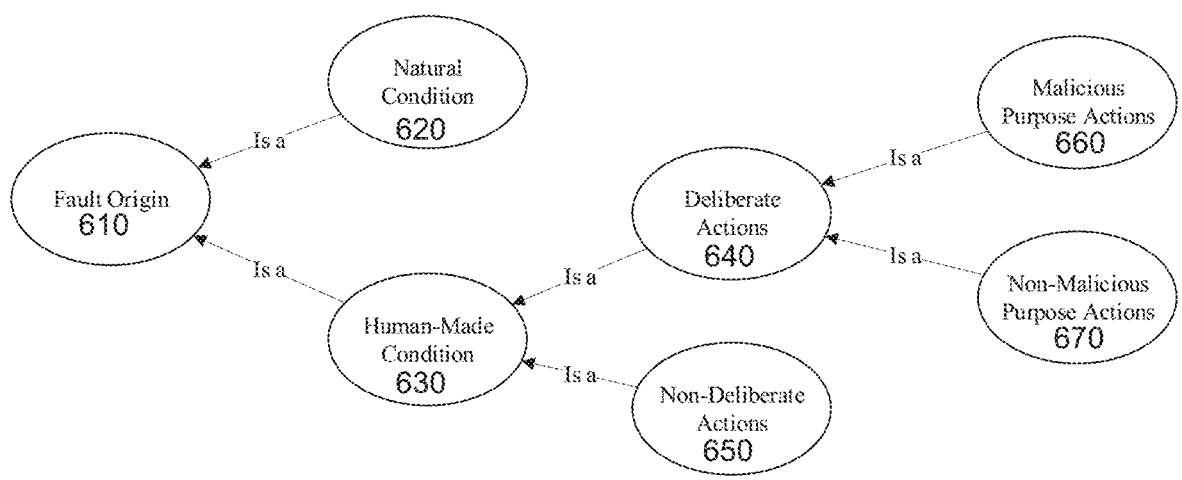
FIG. 6 is a diagram of an example fault origin taxonomy.

FIG. 6 is a diagram of an example fault origin taxonomy 600. Fault Origin 610 is the cause of the fault, which can be categorized by the Fault Origin Taxonomy. Fault origin can assist in the identification of whether the current fault can be applied to the SUA. Generally, a fault can be introduced due to human errors (human made conditions) 630 or natural conditions 620, such as technologies, materials, or facilities used to create the product, as well as the physical environment interacting with the product during system operation. The existence of such factors allows the proposed framework to generate appropriate faults based on a knowledge base. In the fault origin taxonomy 600, human-made errors (conditions 630) are further divided into deliberate actions 640 and non-deliberate actions 650, where the deliberate actions 640 are with malicious purpose actions 660 or with non-malicious purpose actions 670.

Phase of Introduction is the phase when a fault was introduced into the system. It can be "development" or "operation".

Domain of a fault can be software or hardware.

Occurrence describes the time characteristics of a fault. Faults can be categorized into transient faults, periodic faults, and permanent faults. Transient faults occur unpredictably at random moments within the components of a system. Periodic faults occur repeatedly with the same time intervals. Permanent faults are the faults that usually occur one time and lead to permanent errors. This type of fault will change the states or behaviors of a component immediately and thus are apt to be detected relatively easily. Examples of permanent faults are an overheating problem, which permanently damages the CPU circuits in hardware, and an invalid memory access that leads to a system halt in software.

Fault Category groups the way faults can be generated for the system under analysis. Details are described further herein with respect to fault generation.

Effect of a fault is that the host entity is in an erroneous state. Abnormal behaviors of the host entity will be described for the erroneous state. For fault simulation, the information provided by the properties "Effect" and "Triggering Condition" will be combined with the property "state" of the host entity to mimic the activation and propagation of such fault.

Impact Direction is categorized into upstream, downstream, and self. This property determines the impacted property of the host entity. Faults with "upstream" impact direction will change the inputs of their host entities; "downstream" impact direction faults will change the outputs of their host entities. An impact direction of "self" means that faults will change the behaviors of their host entities' sub-entities.

States of a fault, States(·)=⟨Name, Type, Condition⟩, includes the state of a fault which can be predefined as Type∈{Dormant, Activated, Terminated}. The meaning of the above states can be taken literally. Dormant faults are faults residing in a system or component that have not been activated; activated faults are faults that continually or periodically affect the working states of components or systems. The state of a fault may change to a terminated state when the fault is isolated or fixed. The Condition of the Activated state is known as the Triggering Condition, which denotes the ways to activate a fault. The faults, whether introduced at the requirement, design, or development phase, can be activated during system testing, manufacturing, or operation. The triggering condition encompasses three components: (1) the specific configuration(s) that the system can be in for the fault to be triggered; (2) the operation(s), i.e., the series of behaviors that the system can perform for the fault to be triggered; and/or (3) which dependencies and other events are to occur for the fault to be triggered.

Conventionally, faults have been classified through various perspectives, such as dependability (Avižienis et al. 2004)(Avizienis et al. 2004), scientific workflow (Lackovic et al. 2010), and service-oriented architecture (Brüning et al. 2007)(Hummer 2012).

In the ontological concepts provided herein, "phase of creation or occurrence" is denoted by the fault's property "phase of introduction". The existing perspectives "Objective", "Intent", "Phenomenological Cause" and "Capability" are categorized into the fault's property "Fault Origin". The attribute "Host Entity" from fault ontology reflects the perspective of "System Boundaries".

Based on the properties and taxonomies provided by the fault ontology, a fault can be modeled and analyzed in association with componential and functional ontologies. Based on the described high-level concepts, low-level ontologies can be created for representing specific types or individuals of components, flows, functions, and faults.

Low-level ontologies and individuals (level 1 and level 0) are described. Derived from the high-level ontologies, the concepts described in low-level ontologies provide more specific information about the class than the corresponding concepts in high-level ontologies. An example of an ontology described in level 1 could be the processor ontology described in Table 2.

Along with the system development, detailed information can be chosen and modeled. In this way, low-level ontologies with specific information can be used in system models.

An individual (the specific instance of a component, a flow or a function) or a low-level ontology will completely inherit all the properties pertaining to the related concepts in their parent ontologies. This mechanism can effectively reuse the historical data and experts' experience since knowledge, such as the composites or behaviors that are shared by multiple specific types of a class can be described in the parent ontologies. In this case, the knowledge will automatically impact all descendants derived from the high-level concept.

The proposed ontologies may be integrated by attaching constraint relationships between the ontological concepts. This provides a framework for fault generation and propagation.

Regarding dependencies and constraints, dependencies exist between the attributes of the proposed ontologies. These dependent links reflect the relations between the ontological concepts. Dependency rules and the corresponding explanations are listed in Table 8 by using the notations described in Table 7.

TABLE 7

Notations for Dependency Rules

| Notations | Description |
|---|---|
| CP | A class or individual component |
| FL | A class or individual flow |
| FC | A class or individual function |
| FA | A class or individual fault |
| NULL | A class which is missing or does not exist |
| KB | The knowledge base; KB = {KCP, KFL, KFC, KFA} |
| KCP | The set of all components included in the knowledge base |
| KFL | The set of all flows included in the knowledge base |
| KFC | The set of all functions included in the knowledge base |
| KFA | The set of all faults included in the knowledge base |
| SYS | A set of components, flows, and functions; SYS $\subseteq$ KB; SYS = {SCP, SFL, SFC} |
| SCP | A set of all components included in a system; SCP $\subseteq$ KCP |
| SFL | A set of all flows included in a system; SFL $\subseteq$ KFL |
| SPC | A set of all functions included in a system; SFC $\subseteq$ KFC |
| SFA | A set of all faults that can occur in a system; SFA $\subseteq$ KFA |
| X, Y, Z | Free variables that could be a function, a component, or a flow |

TABLE 8

Rules of Dependencies between Ontological Concepts

| No. | Rules | Description |
|---|---|---|
| ER01. | $\forall FC, State(FC) \in \{Operating, Degraded, Lost\}$; | The state of a function can be operating, degraded, or lost. |
| ER02. | $\forall FL, Type(FL) \in \{Material, Energy, Data\}$; | The type of a flow can be material, energy, or data |
| ER03. | $\forall CP, Domain(CF) \in \{Software, Hardware\}$; | The domain of a component can be software or hardware. |
| ER04. | $\forall CP, Is\_a(States(CP)) \in \{Nominal, Faulty\}$ | The state of a component can be classified into nominal and faulty. |
| ER05 | $Y \in ComposedOF(X) \rightarrow X \neq Y$, (Is_a(X) = Component and Is_a(Y) = Component) or (Is_a(X) = Component and Is_a(Y) = Flow) or (Is_a(X)Function and Is_a(Y) = Flow) or (Is_a(X) = Function and Is_a(Y) = Function) | A component may include several components and flows. A function may include several sub funtions and flows. |
| RE06. | Is_a(X) $\in$ {Component,Function} $\rightarrow$ Is_a(Inputs(X)) = Flow and Is_a(Outputs(X)) = Flow; | The inputs and outputs of a component or a function shuld be flows. |
| ER07. | Is_a(Source(FL)) $\in$ {Component,Function},Is_a(Sink(FL)) $\in$ {Component,Function}; | The source and sink of a flow should be functions or components. |
| ER08. | $\forall FL, Is\_a(Source(FL)) = Is\_a(sink(FL))$; | The types of the source and sink of a flow should be indentical. |
| ER09. | $\forall CP, Is\_a(Purpose(CP)) = Function$; | The purposes of a component should be a function. |
| ER10. | $\forall FL, Is\_a(Carrier(FL)) = Component$; | The carrier of a flow should be a component. |
| RE11. | $\forall CP, \forall FC, FC \in Purpose(CP) \rightarrow Inputs(CP) = Inputs(FC)$ and $Outputs(CP) = Outputs(FC)$; | A component will have the same inputs and outputs with the function that is the purpose of such component or flow. |

Table 8 provides some examples of the relations between components, flows, and functions in the framework described herein. Compliance to these relations guarantees the integrity of the system models.

Beyond the rules, Table 9 explains the constraints existing in the interaction between components, flows, and functions for modeling the interaction between these entities. In addition, these exemplary rules are used in fault propagations through different components and flows.

TABLE 9

Interaction Rules between Ontological Concepts

| No. | Interaction Rules | Description |
|---|---|---|
| PR01. | CP = Source(FL') → ∃X,X ∈ Outputs (CP) and X ∈ Inputs (FL); | The source of a flow is the component whose outputs should be equal to the inputs of the flow. |
| PR02. | CP = Sink(FL) → ∃X,X ∈ Inputs(CP) and X ∈ Outputs(FL); | The sink of a flow is the component whose inputs should be equal to the outputs of the flow. |
| PR03. | ∀FA,Host_Entity(FA) = X and State(FA) = Activated → State(X) = Effect(FA); | The activation of a fault will change its host entity into the state described by effect of that fault. |
| PR04. | CP = NULL → Outputs(CP) = NULL; | When a component is missing, the outputs of that component will be invalid. (NULL represents an invalid value.) |
| PR05. | FL = NULL → Outouts(FL) = NULL; | When a flow is missing, the outputs of that flow will be invalid. |
| PR06. | Source(FL) = NULL → FL = NULL; | If the source of a flow is invalid, then that flow will be invalid. |

Based on the preceding rules of dependencies, the models created by the ontological concepts represent the structure and interaction of the components and functions in a system.

For fault analysis, the next step is generating faults based on the properties related to the components and functions in the system under analysis. Depending on the properties described by fault ontologies, faults can be quickly organized and generated by referring to a series of fault generation rules.

Fault generation is the process that generates the faults that may affect the components and functions of the SUA. The properties of these components and functions (from ontologies) are the primitives used for fault generation. Deviation of these properties from their design/expected thresholds is the principle used for injecting faults into such components or functions. For example, a missing composite (from the property "composed of" of a component's ontology) can be a principle for injecting faults such as a missing call of a specific routine in a software program. Principles for fault generation are interpreted herein. Note that flows are not considered as entities for fault generation because every malfunction of a flow is caused by one or more faults that occurred in some components or functions. Also, a flow, itself, is a representation of the transfer of objects governed by natural laws which are considered to be unbreakable herein.

To clearly represent the generated faults and easily distinguish the components and functions before and after fault generation, the notations described in Table 7 are extended to the ones in Table 10.

TABLE 10

Notations for Representing Fault Generation Principles

| Notations | Description |
|---|---|
| $CP_g$ | The original component selected for fault generation |
| $CP_f$ | The component with the generated fault |
| $FC_g$ | The original function selected for fault generation |
| $FC_f$ | The function with the generated fault |
| FA | The generated fault |
| $KB_g$ | The knowledge base with original components, flows, and functions |
| $KB_f$ | The knowledge base with faulty components and functions |
| $SYS_g$ | The original system including the original components, flows, and functions, $SYS_g \subseteq KB_g$, $SYS_g = \{SCP_g, SLF_g, SFC_g\}$ |
| $SYS_f$ | The system with the generated faults including the components, flows, and functions, $SYS_f \subseteq KB$, $SYS_f = \{SCP_f, SLF_f, SFC_f\}$ |
| $SCP_g, SLF_g, SFC_g$ | The set of all components, all flows, and all functions in the original system respectively |
| $SCP_f, SLF_f, SFC_f$ | The set of all components, all flows, and all functions in the fault-injected system respectively |
| $X_g, Y_g, Z_g$ | Free variables that could be functions, components, or flows in the original system |
| $X_f, Y_f, Z_f$ | Free variables that could be functions, components, or flows in the system with faults |

In summary, use the suffix o to represent the entities in the original system, and use the suffix f to denote the entities in the system with the generated faults. In addition to the notations described for entities, new mathematical and logical symbols are provided.

Table 11 summarizes these symbols. Some stem from symbols described in Linear Temporal Logic (LTL). In Table 11, the symbol "·" represents a mathematical or logical expression. The symbol Value denotes the instantaneous value of the expression at a time step during the simulation for fault analysis. The process of simulation is interpreted further herein.

TABLE 11

Symbols used for the representation of rules

| Symbols | Description |
|---|---|
| N(·) | The expression will be true in the next step. (LTL) |
| G(·) | The expression will always be true. (LTL) |
| F(·) | The expression will be true in some steps in the future. (LTL) |
| $Value_t(·)$ | The value of the expression at the time step t. |

Table 12 introduces the constraints applied for fault generation. These constraints are derived from the concepts and taxonomies described by the fault ontology described above.

TABLE 12

General Constraints for Fault Generation

| No. | Constraints | Fault Generation Principles |
|---|---|---|
| GC01. | Host_Entity(FA) ∈ {Component, Function}; | The host entity of a fault can be a component or a function. |
| GC02. | Fault_Origin(FA) ∈ {Nature, Human}; | Fault origin can be nature, human, or any subtype of these two mentioned in the fault origin taxonomy. |
| GC03. | Phase_of_Introduction(FA) ∈ {Development, Operation}; | A fault can be introduced into a system during the development phase (e.g., a software defect) or during the operational phase (e.g., a pipe leakage). |
| GC04. | Phase_of_Introduction(FA) = Development → Fault_Origin(FA) = Human; | All faults occurring during the development phase are caused by human errors. |
| GC05. | Domain(FA) ∈ {Software, Hardware}; | Faults can be classified as software faults and hardware faults. |
| GC06. | Domain(FA) = Domain(Host_Entity(FA)); | The domain of faults and their host entities shall be consistent. |
| GC07. | Occurrence(FA) ∈ {Transient, Periodic, Permanent}; | A fault's occurrence category can be transient, periodic, or permanent. |
| GC08. | (State(FA) = Activated → F(State(FA) = Dormant)) → Occurrence(FA) ∈ {Transient, Periodic}; (State(FA) = Activated → ¬F(State(FA) = Dormant)) → Occurrence(FA) = Permanent; | During the fault analysis process, the state of a transient fault or a periodic fault may switch from "Activated" back to "Dormant", but a permanent fault cannot. |
| GC09. | Impact_Direction(FA) ⊆ {Upstream, Downstream, Self}; | The impact direction of a fault can be upstream, downstream, or both. |
| GC10. | (∃X, $X_o$ ∈ Inputs($CP_o$), $X_f$ ∈ Inputs($CP_f$), Is_a($X_o$) = Is_a($X_f$) ∩ F($Value_t(X_o)$ ≠ $Value_t(X_f)$)) → Impact_Direction(FA) = Upstream; (∃X, $X_o$ ∈ Outputs($CP_o$), $X_f$ ∈ Outputs($CP_f$), Is_a($X_o$) = Is_a($X_f$) ∩ F($Value_t(X_o)$ ≠ $Value_t(X_f)$)) → Impact_Direction(FA) = Downstream; (∃X, $X_o$ ∈ Inputs($CP_o$), $X_f$ ∈ Inputs($CP_f$), Is_a($X_o$) = Is_a($X_f$) ∩ F($Value_t(X_o)$ ≠ $Value_t(X_f)$) ∩ (∃Y, $Y_o$ ∈ Outputs($CP_o$), $Y_f$ ∈ Outputs($CP_f$), Is_a($Y_o$) = Is_a($Y_f$) ∩ F($Value_t(Y_o)$ ≠ $Value_t(Y_f)$)) → Impact_Direction(FA) = Both; | Faults with the impact direction "upstream" will affect the inputs of their host entities; Faults with the impact direction "downstream" will affect the outputs of their host entities; Faults with the impact direction "both" will affect the inputs and outputs of their host entities. |
| GC11. | States(FA) ⊆ {Dormant, Activated, Terminated}; | A fault's state can be dormant, activated, or terminated. |
| GC12 | States(FA) = Dormant → F(Type(State($X_f$)) = Normal); States(FA) = Activated → Type(State($X_f$)) = Faulty; States(FA) = Terminated → G(Type(State($X_f$)) = Normal); | A dormant fault means that the fault has not affected component's behaviors, i.e., the state of its host entity is normal. An activated fault means that the fault has been triggered and affected the behaviors of its host entity, i.e., the state of its host entity is faulty. A terminated fault means that the fault has been removed from its host entity and will not affect its behaviors. |

Fault generation principles are described and explained in terms of the properties of components or functions. For properties which are a set (e.g., the property "composed of" denoting a set of sub components), the deviation of such a property could be a missing, additional, or incorrect element of that set. For properties which are a measure or scalar (e.g. the property "mass" of a component "pipe"), the deviation of such a property could be an incorrect value compared to the designer expected value. The type of deviation and the related property compose the categories of faults. As described further herein, fault generation principles for different fault categories are introduced. Note that the deviations of some properties would break natural laws or are logically impossible. As a result, only the properties to which fault generation principles are applicable are described here.

A "Missing Property" is a type of fault where a property of an individual component or function described by the ontological concepts is missing. For example, a method or a class pertaining to a software program is forgotten by the system designer. To inject this type of fault, an instance with the faulty property should exist in the SUA. The effect of such a fault complies with the following rules: (1) if the property is a set, the faulty element in the set will be moved out; (2) if the property is a variable or a scalar, the invalid value "NULL" will be assigned to the variable or the scalar. Table 13 shows the fault generation principle of missing property faults.

TABLE 13

Fault Generation Principle for Missing Property Faults

| No. | Applicable Properties | Fault Generation Principles | Description |
| --- | --- | --- | --- |
| MP01. | Composed of | X = Host_Entity(FA) → ∃Y, Y ∈ Composed_of ($X_o$) ∩ Y ∉ Composed_of ($X_f$) ∩ Outputs(Y) = ∅ ∩ (∀Z, Z ∈ Composed_of ($X_o$), Z ≠ Y → Z ∈ Composed_of ($X_f$)); | The faulty component or function does not exist in the faulty system configuration when the fault is activated. Also, all the outputs of the faulty component or function will be invalid. |
| MP02. | Location | X = Host_Entity(FA) → ∃Y, Y ∈ Location($X_o$) ∩ Y ∉ Location($X_f$) ∩ Outputs(Y) = ∅ ∩ (∀Z, Z ∈ Location($X_o$), Z ≠ Y → Z ∈ Location($X_f$)); | The faulty component or function does not have the location relation with the missing component or function when the fault is activated. Also, all the outputs of the missing component or function will be invalid. |
| MP03. | Inputs | X = Host_Entity(FA) → ∃FL, FL ∈ Inputs($X_o$) ∩ FL ∉ Inputs($X_f$) ∩ Qualities (FL) = NULL; | One or more input ports of the faulty component or function will be removed. The variables related to the input ports will be equal to the invalid value "NULL". |
| MP04. | Outputs | X = Host_Entity(FA) → ∃FL, FL ∈ Outputs($X_o$) ∩ FL ∉ Outputs($X_f$) ∩ Qualities(FL) = NULL; | One or more output ports of the faulty component or function will be removed. The variables related to the output ports will be equal to the invalid value "NULL". |
| MP05. | Purpose | X = Host_Entity(FA) → ∃Y, Y ∈ Purpose ($X_o$) ∩ Y ∉ Purpose($X_f$) ∩ Purpose ($X_f$) ≠ ∅ ∩ Inputs(Y) = ∅ ∩ Outputs(Y) = ∅; | The function which is the purpose of the faulty component will be removed from the original system. |
| MP06. | Qualities | X = Host_Entity(FA) → (∃Q, Q ∈ Qualities($X_o$) ∩ Q ∉ Qualities($X_f$)); | Missing qualities usually happen when system designers forget to describe constraints or expected values to some of system qualities. |
| MP07. | States | X = Host_Entity(FA) → ∃S, S ∈ States($X_o$) and S ∉ States($X_f$); | One or more states of the faulty component or function are removed. |

An "Additional Property" is a type of fault where an extra element of the property of a component or function is injected into the system under analysis. Table 14 reflects the triggering conditions and effects related to different types of faults. The selection of the new entities added to the system depends on the configuration of the system. Conventionally, human interactions are required for the entity selection.

TABLE 14

Fault Generation Principle for Additional Property Faults

| No. | Applicable Properties | Fault Generation Principles | Description |
| --- | --- | --- | --- |
| AP01. | Composed of | X = Host_Entity(FA) → ∃Y, Y ∉ Composed_of ($X_o$) ∩ Y ∈ Composed_of ($X_f$) ∩ (∀FL ∈ (Inputs(Y) ∪ Outputs(Y)), FL ∈ $SYS_f$); | A new composite will be added into the system configuration and the inputs and outputs of the added composite will be connected to the appropriate types of flows. |
| AP02. | Location | X = Host_Entity(FA) → ∃Y, Y ∉ Location($X_o$) ∩ Y ∈ Location($X_f$) ∩ (∃FL ∈ (Inputs(Y) ∪ Outputs(Y)), FL ∈ $SYS_f$); | A new location relation will be built between the faulty component or function and the additional component or function. Flows between them will be created, which may propagate the impact of such faults. |
| AP03. | Inputs | X = Host_Entity(FA) → ∃FL, FL ∉ Inputs($X_o$) ∩ FL ∈ Input($X_f$) ∩ FL ∈ $SYS_f$ ∩ Inputs($X_o$) ⊂ Inputs($X_f$); | A new input will be added to the faulty component or function. The added input will be connected to the appropriate types of flows. |
| AP04. | Outputs | X = Host_Entity(FA) → ∃FL, FL ∉ Outputs($X_o$) ∩ FL ∈ Outputs($X_f$) ∩ FL ∈ $SYS_f$ ∩ Outputs($X_o$) ⊂ Outputs($X_f$); | A new output will be added to the faulty component or function. The added output will be connected to the appropriate types of flows. |

TABLE 14-continued

Fault Generation Principle for Additional Property Faults

| No. | Applicable Properties | Fault Generation Principles | Description |
|---|---|---|---|
| AP05. | Purpose | $X = \text{Host\_Entity}(FA) \rightarrow \exists Y, Y \notin \text{Purpose}(X_o) \cap Y \in \text{Purpose}(X_f) \cap Y \in \text{SYS}_f \cap Y \in KB_f;$ | A new function will be added to the faulty component. The extra purpose will be selected from the knowledge base with faulty components and functions. |
| AP06 | Qualities | $X = \text{Host\_Entity}(FA) \rightarrow (\exists \text{Quality}, \text{Quality} \notin \text{Qualities}(X_o) \cap \text{Quality} \in \text{Qualities}(X_f));$ | An additional constraint of qualities may be described by system designers mistakenly. This mistaken constraint to system qualities may change system behaviors unexpectedly. |
| AP07. | States | $X = \text{Host\_Entity}(FA) \rightarrow \exists \text{State}, \text{State} \notin \text{States}(X_o) \cap \text{State} \in \text{States}(X_f) \cap X_f \in KB_f;$ | A new state will be added to the faulty component. The extra state with transition conditions will be selected from the knowledge base with faulty components and functions. |

An "Incorrect Property" is a type of fault where a property possesses an element or a value that should not be assigned to that property according to the system design. If the target property is a set of elements, an incorrect property fault means that a correct element is replaced by an incorrect one. If the target property is a variable with values, the fault corresponds to a deviation of the target variable from the design value. Table 15 displays the fault generation principles for incorrect property faults. Selecting which entities to replace depends on the configuration of the system, and, conventionally, human interaction is required to make this selection.

TABLE 15

Fault Generation Principle for Incorrect Property Faults

| No. | Applicable Properties | Fault Generation Principles | Description |
|---|---|---|---|
| IP01. | Composed of | $X = \text{Host\_Entity}(FA) \rightarrow \exists Y \exists Z, Y \in \text{Composed\_of}(X_o) \cap Z \notin \text{Composed\_of}(X_o) \cap Y \notin \text{Composed\_of}(X_f) \cap Z \in \text{Composed\_of}(X_f) \cap \text{Is\_a}(Y) \neq \text{Is\_a}(Z) \cap (\forall FL, FL \in (\text{Inputs}(Z) \cup \text{Outputs}(Z) \cap FL \in \text{SYS}_f);$ | The existing components or functions in the original system will be replaced by some other components or functions with different types. The inputs and outputs of the replacing components or functions will have appropriate connections of flows. |
| IP02. | Location | $X = \text{Host\_Entity}(FA) \rightarrow \exists Y \exists Z, Y \in \text{Location}(X_o) \cap Z \notin \text{Location}(X_o) \cap Y \notin \text{Location}(X_f) \cap Z \in \text{Location}(X_f) \cap \text{Is\_a}(Y) \neq \text{Is\_a}(Z) \cap (\forall FL, FL \in (\text{Inputs}(Z) \cup \text{Outputs}(Z) \cap FL \in \text{SYS}_f);$ | The existing location relations of the faulty component or function will be replaced by some other location relations. The new relations include different types of components or functions from the replaced ones. The inputs and outputs of the replacing components or functions will be appropriately connected to the faulty component or function. |
| IP03. | Inputs | $X = \text{Host\_Entity}(FA) \rightarrow \exists Y \exists Z, Y \in \text{Inputs}(X_o) \cap Z \notin \text{Inputs}(X_o) \cap Y \notin \text{Inputs}(X_f) \cap Z \in \text{Inputs}(X_f) \cap (\text{Is\_a}(Y) \neq \text{Is\_a}(Z) \cup (\text{Is\_a}(Y) = \text{Is\_a}(Z) \cap \text{Value}_t(Y) \neq \text{Value}_t(Z)));$ | An existing input is replaced by another input with a different type or the value of an existing input is changed. |
| IP04. | Outputs | $X = \text{Host\_Entity}(FA) \rightarrow \exists Y \exists Z, Y \in \text{Outputs}(X_o) \cap Z \notin \text{Outputs}(X_o) \cap Y \notin \text{Outputs}(X_f) \cap Z \in \text{Outputs}(X_f) \cap (\text{Is\_a}(Y) \neq \text{Is\_a}(Z) \cup (\text{Is\_a}(Y) = \text{Is\_a}(Z) \cap \text{Value}_t(Y) \neq \text{Value}_t(Z)));$ | An existing output is replaced by another output with a different type or the value of an existing output is changed. |
| IP05. | Qualities | $X = \text{Host\_Entity}(FA) \rightarrow (\exists \text{Quality}, \text{Quality} \in \text{Qualities}(X_o) \cap \text{Quality} \notin \text{Qualities}(X_f)) \cup (\exists \text{Quality1} \exists \text{Quality2}, \text{Quality1} \in \text{Qualities}(X_o) \cap \text{Quality2} \in \text{Qualities}(X_f) \cap \text{Is\_a}(\text{Quality1}) = \text{Is\_a}(\text{Quality2}) \cap \text{Value}_t(\text{Quality1}) \neq \text{Value}_t(\text{Quality2}));$ | The type or value of qualities of the target component or function deviates from the original system. |
| IP06. | Purpose | $X = \text{Host\_Entity}(FA) \rightarrow \exists Y \exists Z, Y \in \text{Purpose}(X_o) \cap Z \notin \text{Purpose}(X_o) \cap Y \notin \text{Purpose}(X_f) \cap Z \in \text{Purpose}(X_f);$ | The function related to the target component differs from the original one. |
| IP07. | States | $X = \text{Host\_Entity}(FA) \rightarrow \exists \text{State1} \exists \text{State2}, \text{State1} \in \text{States}(X_o) \cap \text{State2} \notin \text{States}(X_o) \cap \text{State1} \notin \text{States}(X_f) \cap \text{State2} \in \text{States}(X_f);$ | One or more state of the faulty component differs from the original ones. |

Regarding fault generation principles, a software routine is used as an example to explain the results from applying the aforementioned fault generation principles to the ontology of components. One type of fault can be covered by exhausting the possible system configurations that satisfy the corresponding principle. Table 16 shows the ontology of the example software routine. In Table 16, the routine is composed of several data structures (e.g., "Hardware_Baudrate", "Hardware_Buffersize", etc.). Its location reflects the position of this routine from two different perspectives: static view and dynamic view. It has several inputs and outputs which will connect to flows. The qualities of the routine include a dynamic parameter "execution time", which is between 0.5 to 2 ms. Meanwhile, the software routine has three possible states (Nominal, Stuck, Incorrect_outputs). For each state, there is a triggering condition that is represented by an if-then rule. Finally, the purpose of this routine is to implement the function "Read_Hw_Parameters" related to a functional ontology which is not shown in this example.

TABLE 16

Example Ontology of the Software Routine "Read Parameters"
Class: HwCtrl.ReadParameters

| | |
|---|---|
| Is_a | Software Routine |
| Composed of | Hardware_Baudrate (data structure), Hardware_Buffersize(data structure), Command_Cache (data structure), Data_Cache (data structure) |
| Locations | Static: in file "readpara.c" |
| | Dynamic: Called by "HwCtrl.SetupThread" |
| Inputs | Input: In_Command(signal), In_Baud_Rate(data), In_Data_Size(data) |
| Outputs | Output: Out_Baud_Rate(data), Out_Data_Size(data), Out_Retum(signal) |
| Qualities | execution time (0.5~2 ms) |
| States | {State: Idle (Nominal), [Triggering Condition: In Command = SIGNAL IDLE], [Behavioral Rules: Out_Return = NULL and Out_Buad_Rate = NULL and Out _Data_Size = NULL]} |
| | {State: Running (Nominal), [Triggering Condition: In Command = SIGNAL ACTIVE], [Behavioral Rules: In Baud Rate = NORMAL HW BAUD RATE and In Data Size = NORMAL HW DATASIZE and Out Return = RETURN OK and Out Baud Rate = NORMAL HW BAUD RATE and Out Data Size = NORMAL HW DATASIZE]} |
| Purposes | Implement the function: Read_Hw_Parameters |

Table 17 summarizes the faults obtained when applying different fault generation principles to the ontology of the example software routine. Since a great number of faults are generated by applying a fault generation principle, generic descriptions are given to summarize the generated faults. In addition, Table 17 describes the ways in which one can inject the corresponding faults into the software routine.

TABLE 17

Fault generation for the example software routine

| Fault Type | Fault Description | Fault Injection Implementation |
|---|---|---|
| Missing Composed of | The designer forgets to describe a data structure in the routine, such as the Hardware_Baudrate, the Hardware_Buffersize, etc. | The behaviors related to the faulty data structure will be removed. |
| Missing Inputs | The designer forgets to describe one or more input parameters, such as the in_command etc. | The behaviors related to the input parameters will be removed. |
| Missing Outputs | The designer forgets to describe one or more output parameters, such as the out_return. | The behaviors related to the output parameters will be removed |
| Missing Locations | The designer forgets to call this routine. (Dynamic Location) | The call of this routine will be removed from the original program. |
| | The developer forgets to write this routine to the file. (Static Location) | The code of this routine will be removed from the original file. |
| Missing Qualities | The designer didn't regulate the routine execution time | A long delay will be added into the original routine. |
| Missing States | The designer forgets to consider a possible state. | The missing state with its triggering condition will be removed. |
| Missing Purposes | Not Applicable. Conflict with the rule MP05. | Not Applicable. |
| Additional Composed of | The designer describes an extra variable in the routine. | An extra variable "dummy_var" will be added to the routine. |
| Additional Inputs | The designer describes an extra input parameter to the routine. | An extra input "dummy_input" of the type "signal" will be added to the routine. |
| Additional Outputs | The designer describes an extra output parameter to the routine | An extra output "dummy_output" of the type "signal" will be added to the routine. |
| Additional Locations | The routine is abnormally called twice. | This routine will be unexpectedly called at another point in the program. |
| Additional Qualities | A new errorenous quality "occupy 20 MB memory" is described. | A dummy data structure will be added to the routine for the extra memory occupation. |
| Additional States | The designer describes an extra state. | An extra state "dummy_state" with triggering conditions will be added to the routine. |

TABLE 17-continued

Fault generation for the example software routine

| Fault Type | Fault Description | Fault Injection Implementation |
| --- | --- | --- |
| Additional Purposes | The designer creates malicious codes in the routine | An extra function (Write_Parameter) will be added to the purpose of this routine. |
| Incorrect Composed of | The type of the data belonging to the routine is wrong. | The data structure "Hardware_Baudrate" will be replaced by the data structure "Hardware_Stopbit". |
| Incorrect Inputs | The type or value of input parameters is wrong. | The input variable "In_Baud_Rate" will be changed to "In_Stop_Bit". |
| Incorrect Outputs | The type or value of output parameters is wrong. | The output variable "Out_Data_Size" will be changed to "Out_Buf_Size". |
| Incorrect Locations | The routine is called at a wrong place. | The calling position of this routine will be changed. |
| Incorrect Qualities | The execution time exceeds the design value. | A delay will be added into this routine. |
| Incorrect States | The state is not correctly described. | The behaviors and triggering conditions of the states will be changed. |
| Incorrect Purposes | The designer misunderstands the requirement. | The purpose of this routine links to another function (Write_Parameter). |

In practice, when a new type of fault is discovered, the new fault can be analyzed by the provided framework by adding specific constraint rules to the ontological concepts. The applicability of the new fault determines which level the new rules should be added to. For example, if a new individual-specific fault is discovered, the constraint can be added to the ontological concepts at level 0. If a more general fault is discovered, such as a defect to all reading parameter routines, the constraint can be described at level 1, adding to the ontology of a general "reading parameter" routine.

Regarding fault analysis methodology, based on the ontological models and generated faults, the fault analysis framework provided herein infers the states of each component during system operation (i.e., system simulation) and further to infer the states of system functions, as detailed herein.

Figure 7:
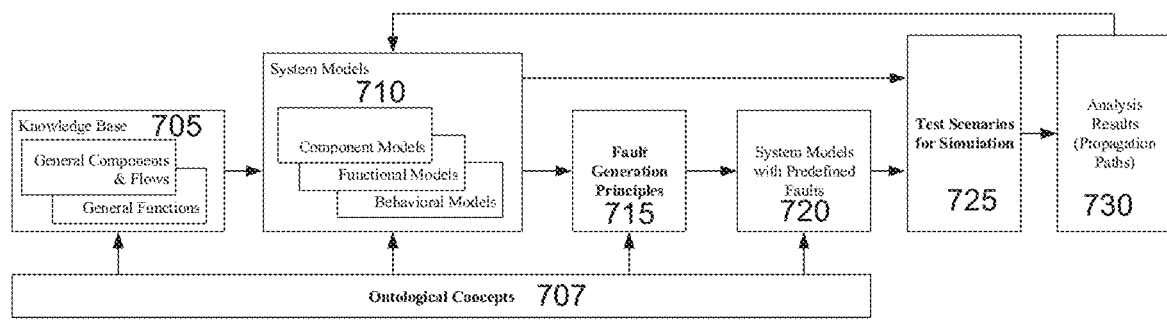
FIG. 7 is a diagram of an example fault analysis methodology.

FIG. 7 is a diagram of an example fault analysis methodology 700. The proposed methodology 700 of fault analysis is illustrated by FIG. 7, which includes tools and outcomes, including the knowledge base 705, system models 710, fault generator (fault generation principles) 715, several system models with faults 720, the fault analyzer (the simulator with test scenarios for simulation) 725, and the results of the analysis (fault propagation paths) 730. These elements are detailed below. The backward link between analysis results 730 and system models 710 denotes that the results can be used for improving the system design.

The knowledge base 705 is a repository comprising the predefined high-level and low-level ontologies of components, flows, functions, and faults. The knowledge base is a well-formatted representation of knowledge generated from historical data and expert's experiences.

The ontological concepts 707 provide the capability of quickly retrieving and reusing experiential data.

System models 710 are the representation of the SUA. Based on the ontological concepts and constraints, the correctness and integrity of the models can be automatically verified.

Fault generation principles 715 are the criteria for generating faults. The ontological concepts allow the system testers to formally describe the fault generation strategy, including the types of faults of interest, etc.

System models with predefined faults 720 is the system configuration with the initial states of components and flows. These models may be used to generate test scenarios which can be simulated by the fault analyzer (simulator) 725.

The fault analysis results 730 are the outcomes of the simulation process. Based on the results, system designers can evaluate the robustness of the system under analysis and formulate an improvement plan to improve the system design. The improved system design can be regressively evaluated by the methodology.

Fault simulation is the process of emulating the behaviors of system components chronologically and deducing the states of these components and their related functions (which could be normal or faulty) to visualize the effects of a fault from component level to system level. This process is implemented by the simulator, an automatic tool which is equipped with a simulation engine to emulate component and function behaviors and the reasoning process.

Figure 8:
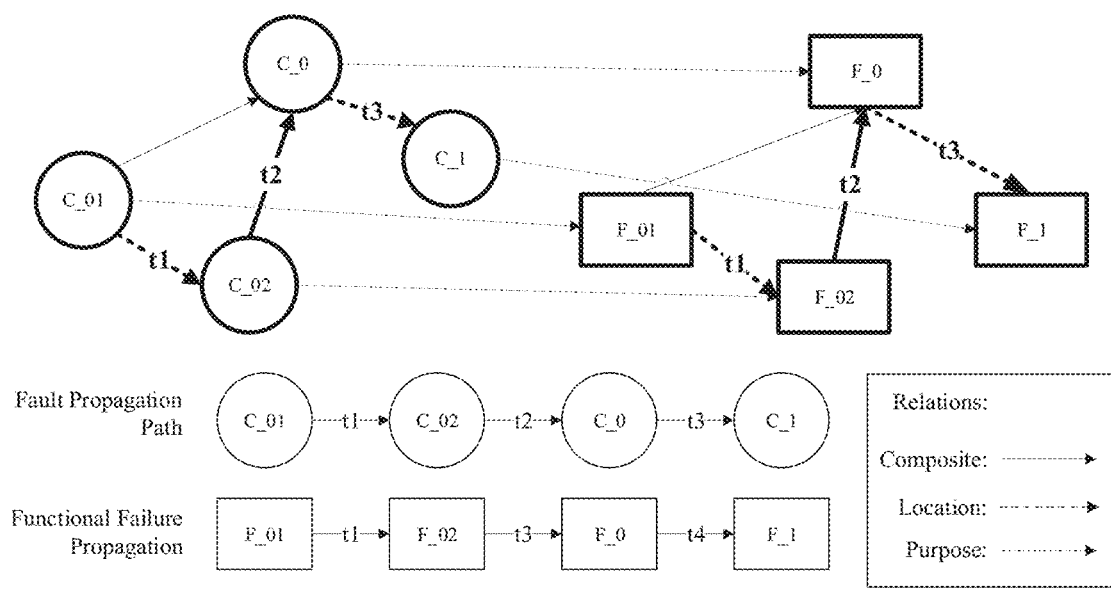
FIG. 8 is a diagram showing a demonstration on fault analysis process inter components.

An overview of the process of fault propagation during a simulation is depicted in FIG. 8. FIG. 8 is a diagram showing a demonstration 800 on fault analysis process inter components. To clearly distinguish components and functions, a component is represented by circular nodes and a function is represented by rectangular nodes. There are three types of relations expressed by links. The directed solid lines denote a composite relation. The arrows point to the component that is the parent of the tail node. For example, the node "C_0" is the parent node of "C_01". The dotted lines denote the fact that these two components are related through their respective "locations". This relation is usually observed with subcomponents, as they belong to the same parent component. Between component nodes and functional nodes, relations of purpose exist to express the fact that the purpose of a component is to implement one or more functions. These relations are represented by dash dot lines.

In FIG. 8, a fault is injected into component "C_01". Using the "purpose" of "C_01" "F_01" is recognized as the function implemented by "C_01". According to the state conditions described for "F_01", the state of "F_01" is inferred to be failed. Subsequently, the faulty state of "C_01" leads to an erroneous output flow, which subsequently causes component "C_02" to be faulty at time "t1". This is because a "connected" location exists between the two components. By executing the behaviors described in "C_02" while referring to the flow between "C_01" and "C_02", the state of "C_02" can be estimated. The fault simulation engine will record this result and infer that the effect of a fault is propagating from "C_01" to "C_02". Also, the effect is spreading from "F_01" to "F_02". At the time "t2", the component "C_0" falls into a faulty state due to the transition condition described in the state machine of the component "C_0", which is composed of "C_01" and "C_02". The engine will recognize that the effect of the fault is propagating from "C_02" to "C_0". At the same time, the function "F_0" is estimated to have failed through its state conditions. At last, the effect of the fault propagates to the component "C_1" and leads to the failure of "F_1".

Figure 9:
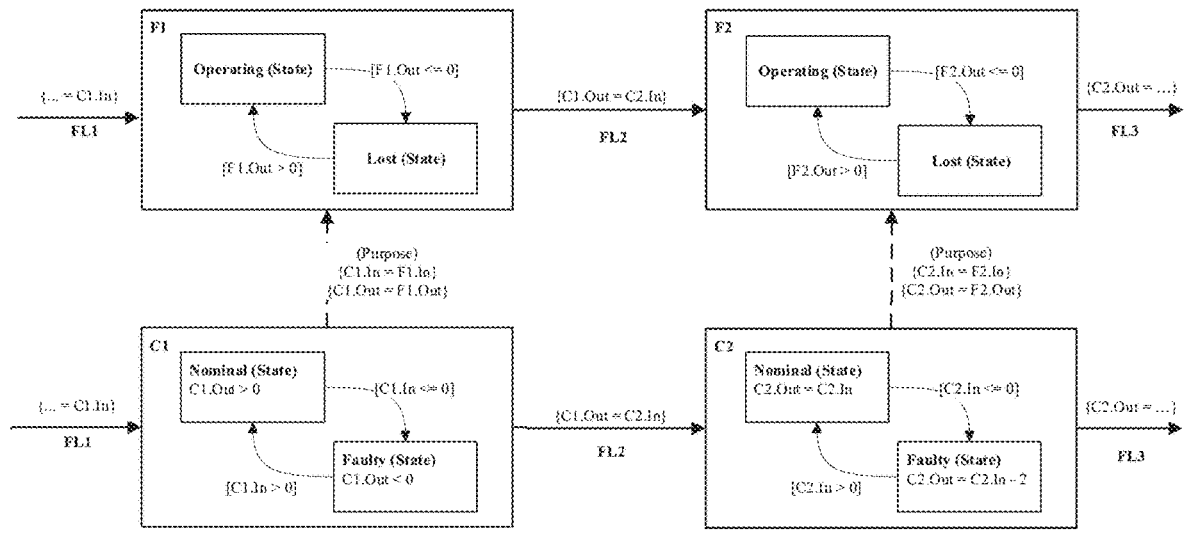
FIG. 9 is a diagram of an example system structure and state diagram.

FIG. 9 is a diagram of an example system structure and state diagram 900. FIG. 9 interprets the rationale of inferring the states of functions, by using an example system with two components. In FIG. 9, components "C1" and "C2" (at the bottom of the figure) are on a propagation path. Each one has a normal and a faulty state with corresponding triggering conditions and behaviors. In each block with a state's name (e.g., Nominal), there are statements that represent the behaviors (i.e., the relations between inputs and outputs), such as "C1·Out>0". The links between state blocks are the triggering conditions for state transitions. This representation is similar to a Finite State Machine (FSM). Also, each component implements a function whose states can be either operating or lost, shown as the dashed lines. The components and their implemented functions will share the same inputs and outputs, depicted as the text besides the dashed lines. During the system simulation, the states of both components "C1" and "C2" can be either nominal or faulty. Suppose the current state of "C1" is nominal, then the output of "C1" can be known as "C1·Out>0". Since the statement "C1·Out=F1·Out", infer that "F1·Out>0". In this case, the state of "F1" can be inferred as "Operating". Next, the output of "C1" will propagate to "C2" via the flow "FL2" with the rule "C_1·Out=C2·In". Through the set of statements that "C1·Out>0," "C1·Out=C2·In," which are derived from "C1" and "FL2", infer that "C2·In >0". Based on the triggering conditions described for "C2", the state of "C2" should be "Nominal". Since the function "F2" is implemented by "C2", the state of "F2" can be similarly inferred as "Operating". When injecting a fault into "C1", the state of "C1" will be forcedly changed to "Faulty". In this case, the output of "C1" will be "C1·Out<0" according to the behaviors described under the faulty state. As a consequence, the state of the function "F1" will be lost because of the statements that "C1·Out<0" and "C1·Out=F_1·Out". Due to the flow "FL2", the effect of the fault will move from "C1" to "C2" and change the state of "C2" from "Nominal" to "Faulty". Finally, the state of "F2" will be judged as "Lost" because of the fact that "C2·Out=F2·Out", "C2·Out=C2·In −2", "C2·In=C1·Out", and "C1·Out<0". The simulation engine will continue inferring until all or selected number of components, flows, and functions are reached. The chart 990 of FIG. 9 lists the evolution of states in time order.

Generally, different types of components and flows will have different latencies between inputs and outputs. For example, a software routine needs 100 milliseconds to carry out the results. Hence, temporal relations may be considered when simulating and analyzing faults, especially for multitasking software distributed on multiple platforms. This issue can be solved by concatenating a time label to each of the variables in the previously mentioned statements. For example, supposing the current time step is "t1", the output of "C1" can be translated into "C1·Out@t1>0", according to the behavioral rules described for "C1". If a latency is described, for example, the latency of "C2" is 4 (time step), then the output of "C2" will be described as "C2·Out@t5=C2·In@t1" since "t5" is the result of an addition between current time step "t1" and the latency "4". Note that the current time step should be attached to existing variables in the triggering conditions for the state transition of components and functions since the inference for state transition should use the value of inputs or outputs at the current time. For example, if the current time is "t1", infer the state of "C1" by judging if the value of "C1·In@t1" is greater than 0 or not. In summary, an ability of the simulation engine is to infer the trueness of the triggering conditions based on the statements derived from the behavioral rules of the preceding components and flows.

Regarding flow merging and branching, in practice, multiple components or functions will possibly connect to the same flow, e.g., two water flows from different pumps merge into one flow using a "Y" pipe, multiple data receivers are attached to a data bus. In this case, the final value of the flow's qualities will be impacted by the connected components or functions. Calculating the final value of the qualities (e.g., a flowrate) depends on the type of such flow and the type of the quality. For example, if the flow is described as a material, such as water, when calculating the quality "flowrate", the final value should be the sum of the output "flowrates" of the connected components. Hence the rule "Sum" will be applied to the variable "flowrate" of the flow "water". Table 18 summarizes some general rules of flow merging. The selection of the rules for a specific flow's quality is usually based on physics or other related standards.

TABLE 18

General Rules for Flow Merging

| Name | Rules | Description | Example Flows and Qualities |
|---|---|---|---|
| SUM | $\text{Value}_t(\text{Quality}(FL)) = \sum_{i=1}^{n} \text{Value}_t(\text{Output}(CP_i));$ | The final value of a quality is the sum of the output values of the connected components | Flowrate of a water flow |
| AVG | $\text{Value}_t(\text{Quality}(FL)) = \frac{1}{n}\sum_{i=1}^{n} \text{Value}_t(\text{Output}(CP_i));$ | The final value of a quality is the average of the outputs of the connected components | The temperature of a water flow combined from two water flows with the same flowrate. |

TABLE 18-continued

General Rules for Flow Merging

| Name | Rules | Description | Example Flows and Qualities |
|---|---|---|---|
| CAT | $Value_f(Quality(FL)) = Concatenate \begin{pmatrix} Value_f(Output(CP_1)), \\ Value_f(Output(CP_2)), \\ \ldots \end{pmatrix};$ | The final value of a quality is the concatenation of the outputs of the connected components | A buffer receiving data from multiple providers. |
| SLT | $Value_f(Quality(FL)) = Select \begin{pmatrix} Value_f(Output(CP_1)), \\ Value_f(Output(CP_2)), \\ \ldots \end{pmatrix};$ | The final value of a quality is the value of the component that is activated (the value is not NULL). | A Control Area Network (CAN) bus with multiple microcontrollers attached. |

Similarly, multiple components may accept objects from a flow. In this case, the actual input of the connected components would be a portion of the flow. For example, if there is a Y-fitting in a piping system, water flow goes into the pipe from one port and goes out from the other two ports. The flowrates of the two output ports should be half of the input flowrate, assuming that the diameters of both output ports are equal.

Table 19 summarizes some example rules of flow branching. The selection of the rules for a specific flow's quality is usually based on physics or other related standards.

TABLE 19

Example Rules for Flow Branching

| Name | Rules | Description | Example Flows |
|---|---|---|---|
| EQU | $Valuet(Input(CPi)) = Valuet(Quality(FL)), 1 < i < N;$ | The connected components will receive the same value from the flow. | Pressure of a water flow, Network broadcasting |
| PMA | $Value_f(Input(CP_i)) = a_i \times Value_f(Quality(FL)),$ $\sum_{i=1}^{N} a_i = 1, 1 < i < N;$ | Every connected component will receive a parameter-controlled value from the flow. | Flowrate of a water flow, Power of an energy flow, Software described networks |

An integrated system failure analysis software toolchain (IS-FAST) is described herein. The tool is implemented to perform fault injection and automatically simulate fault effects propagation based on introduced ontological concepts and rules. The fault simulation stems from the methodology of Integrated System Failure Analysis (ISFA) (Mutha et al. 2013). In the context of ISFA, hardware components are portrayed by the configuration flow graph (CFG) and functional models (FM) are composed of a flowchart of functional blocks. Meanwhile, software component models are given as structure-related UML diagrams (e.g., the deployment diagram, the component diagram, etc.) and functional models are given as dynamic UML diagrams (e.g., the activities diagram, the use case diagram, or the sequence diagram). In the IS-FAST framework, the software and hardware models derive from the ontologies described herein above.

Figure 10:
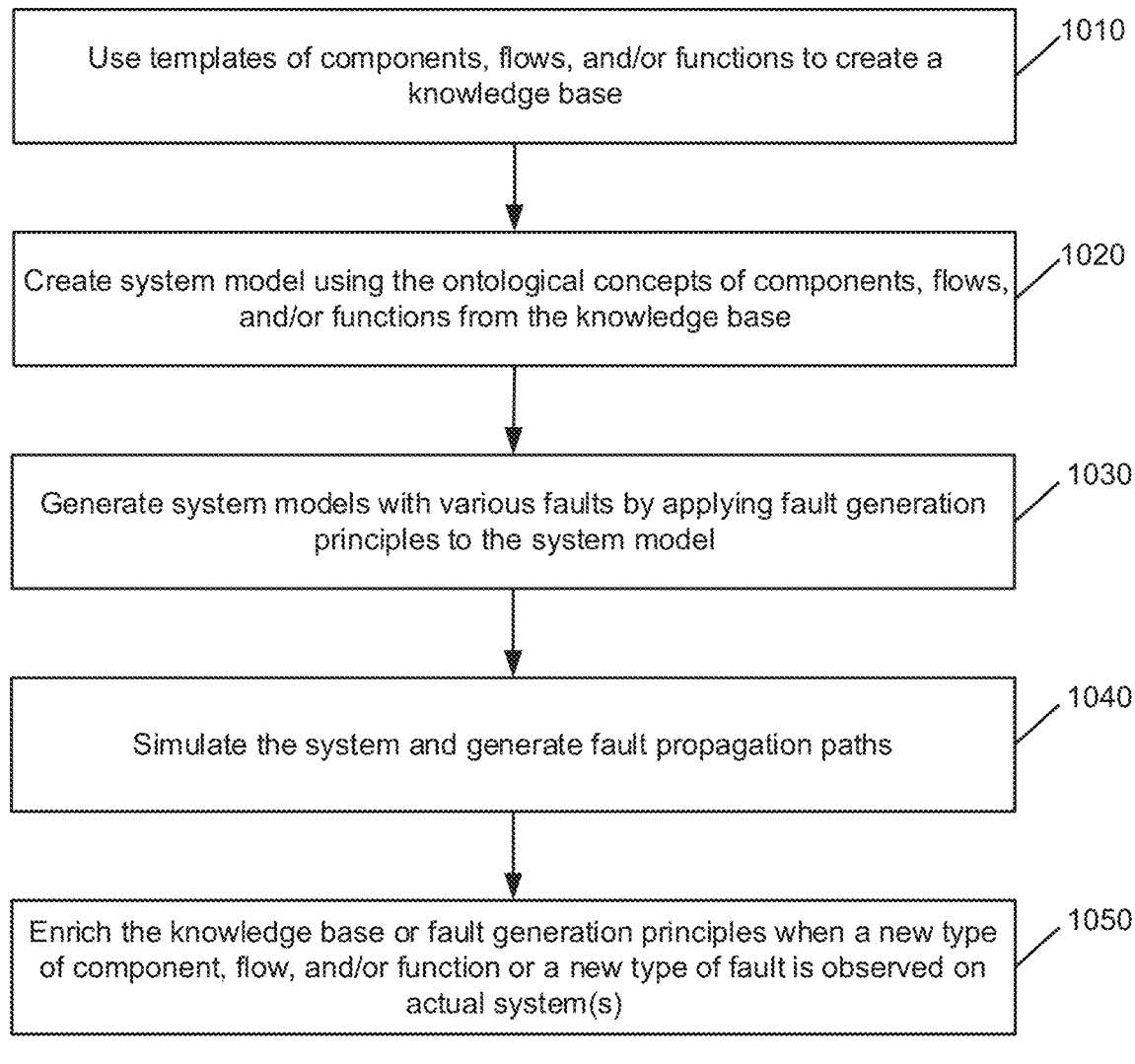
FIG. 10 is an operational flow of an implementation of a method of fault analysis.
Figure 18:
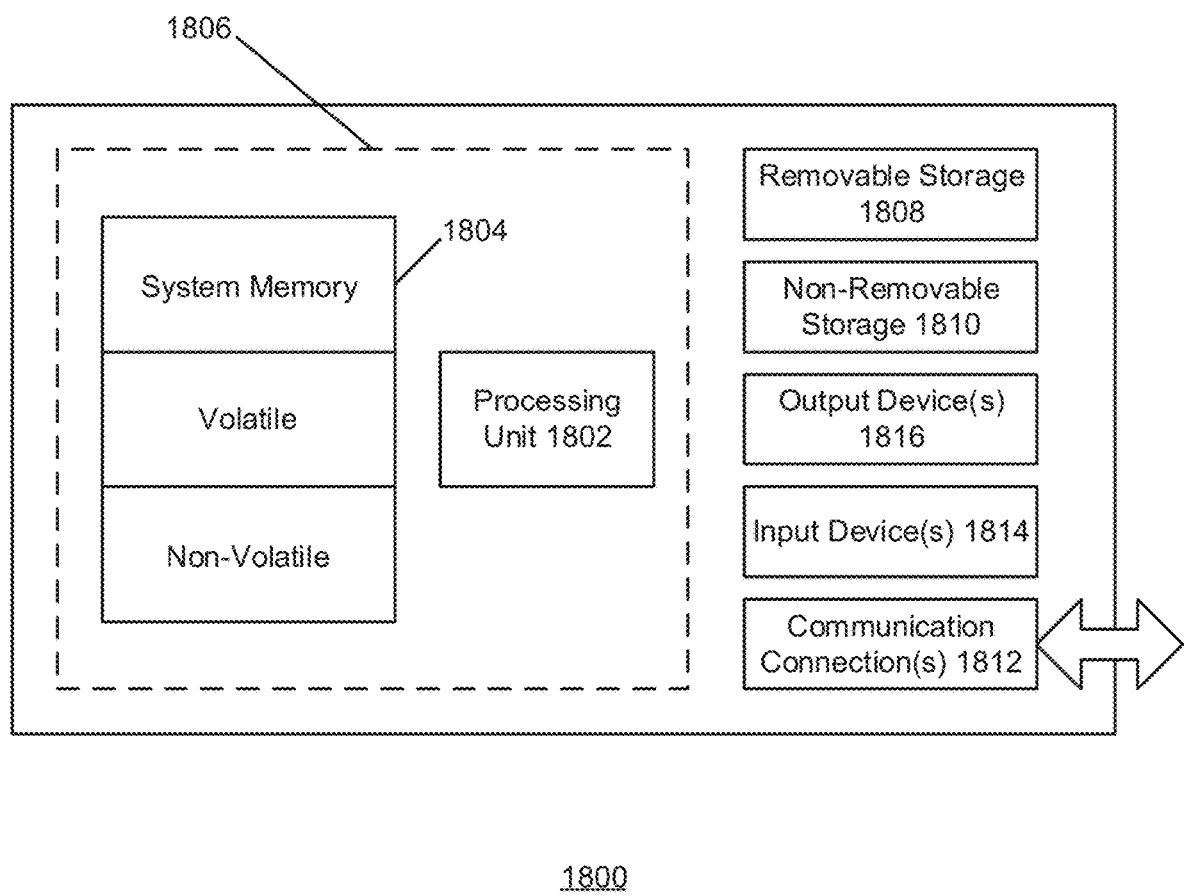
FIG. 18 shows an exemplary computing environment in which example embodiments and aspects may be implemented.

By using the ontological framework, fault analysis can be implemented by the following steps. FIG. 10 is an operational flow of an implementation of a method 1000 of fault analysis. The method 1000 may be implemented using a variety of computing devices such as smartphones, desktop computers, laptop computers, tablets, set top boxes, vehicle navigation systems, and video game consoles. Other types of computing devices may be supported. A suitable computing device for implementing the method is illustrated in FIG. 18 as the computing device 1800.

At 1010, a knowledge base is created using templates of components, flows, and/or functions. At 1020, a system model is created using the ontological concepts of components, flows, and/or functions from the knowledge base.

At 1030, system models with various faults are generated by applying fault generation principles to the system model. At 1040, the system is simulated and fault propagation paths are generated. At 1050, the knowledge base or fault generation principles are enriched when a new type of component, flow, and/or function or a new type of fault is observed on actual systems.

Figure 11:
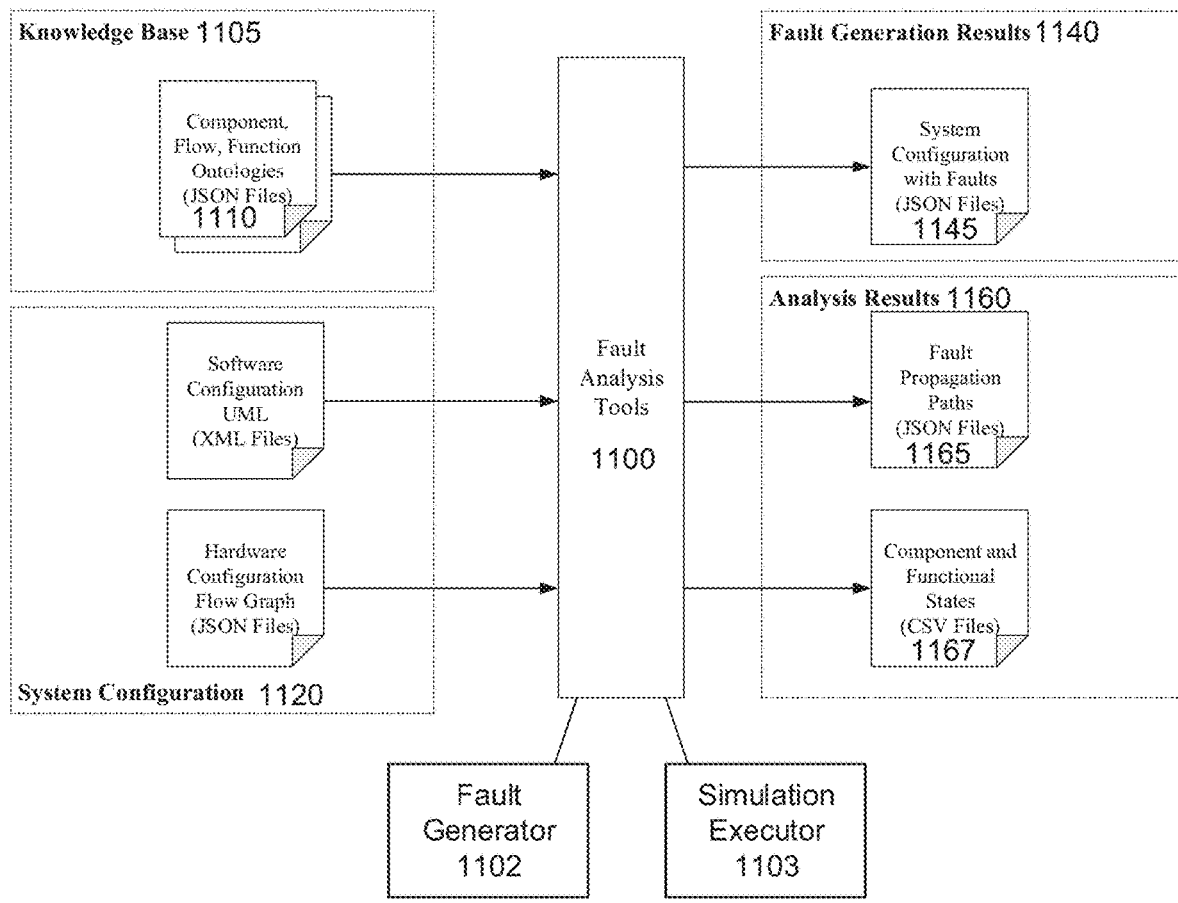
FIG. 11 is a diagram showing example inputs and outputs of an implementation of a fault analysis tool.

The functionality of the fault analysis tool is to automatically generate potential faults based on fault generation principles and to infer propagation paths of such faults through components and functions of a system. FIG. 11 is a diagram showing example inputs and outputs of an implementation of a fault analysis tool 1100. The fault analysis tool 1100 may be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 18 as the computing device 1800.

The inputs of the fault analysis tool 1100 (e.g., a simulation tool) are the ontologies 1110 from a knowledge base 1105, and system configuration 1120. The ontologies 1110, described herein, provide the elements of components and functions, such as the states of components and functions, and the properties of components and flows.

With respect to knowledge base 1105 (JSON files), the knowledge base comprises the concepts of components, flows, and/or functions described by the level 1 to level 3 ontologies. Examples include: properties of components (e.g., the normal working temperature, the maximum pressure tolerated, etc.); the states of the components (e.g., Nominal or Faulty); properties of flows (e.g., the pressure of a liquid flow, the temperature of a steam flow, etc.); properties of functions (e.g., the expected output flowrate, etc.); and the states of the functions (purposes) implemented by components (e.g., Operating, Degraded, or Lost).

With respect to system configuration 1120 (e.g., XML, files), the system configuration includes the individual components, flows, and/or functions described by the level 0 ontologies. Examples include: instances of components, flows, and functions (software and hardware); and links between components, flows, and functions (software and hardware).

The fault analysis tool 1100 comprises a fault generator 1102 and a simulation executor 1103. As a result, the fault analysis tool 1100 provides two types of results: fault generation results 1140 and analysis results 1160. One type of fault generation result 1140 is system configurations with faults 1145 (JSON files). Several JSON files are generated by the fault generator 1102. Each JSON file includes a specific fault. Types of analysis results 1160 are fault propagation paths 1165 (JSON files) and the component and functional states 1167 in each propagation path (CSV file) generated by the simulator executor 1103. The CSV file has the following contents: the states of each component; the states of functions of each component; the evidence for estimating the states (a list of conditions referring to the ontologies).

An implementation of two components of the fault analysis tool 1100 (the fault generator 1102 and the simulation executor 1103) are now described.

Figure 12:
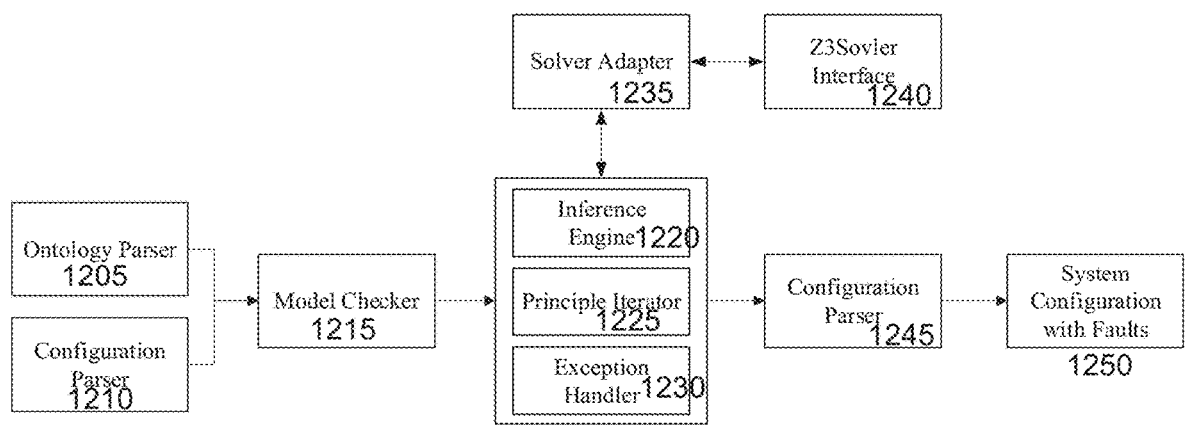
FIG. 12 is a diagram of an example fault generator.

The fault generator 1102 is a model-based tool that generates system configurations with injected faults from the original configuration, based on the fault generation principles and fault ontologies described above. The fault generator 1102 implements the generic and specific principles of fault generation. FIG. 12 is a diagram of an example fault generator 1102.

In the structure of the fault generator 1102, model parsers are software modules that integrate and translate the models of ontologies and configurations, including: the ontology parser 1205 reads structured models that represent the common characteristics of components, flows, and functions (the ontological models are well-organized JSON files); and the configuration parser 1210 reads the elements in the realistic system under analysis, and their connection relationships.

The model checker 1215 reuses the modules of the model validator to check the validity of the models before simulation. It provides the mechanism for checking the validity, consistency, and correctness of the input models based on the dependencies and constraints described in above. Validity verification is the process that checks if the text in the model files follows the modeling standards (e.g., dependencies and constraints described in Table 8).

The inference engine 1220 is in charge of parsing, storing, and solving the propositional statements generated by the simulation executor. In addition, the statement solver should be able to revert to a previous state.

The principle iterator 1225 applies the fault generation principles to one or more components and one or more functions in the system configuration. The iterator 1225 can be configured to generate single fault or multiple faults.

The exception handler 1230 is described to handle the exceptions possibly thrown during the fault generation.

The solver adapter 1235 and solver interfaces 1240 are used to bridge the gap for using a third-party statement solver to check the validity or satisfiability of fault generation principles. In an implementation, an open source SMT solver, or Z3 from Microsoft, may be used.

The generated system configurations 1250 are reformatted by the configuration parser 1245 and stored as JSON files.

Figure 13:
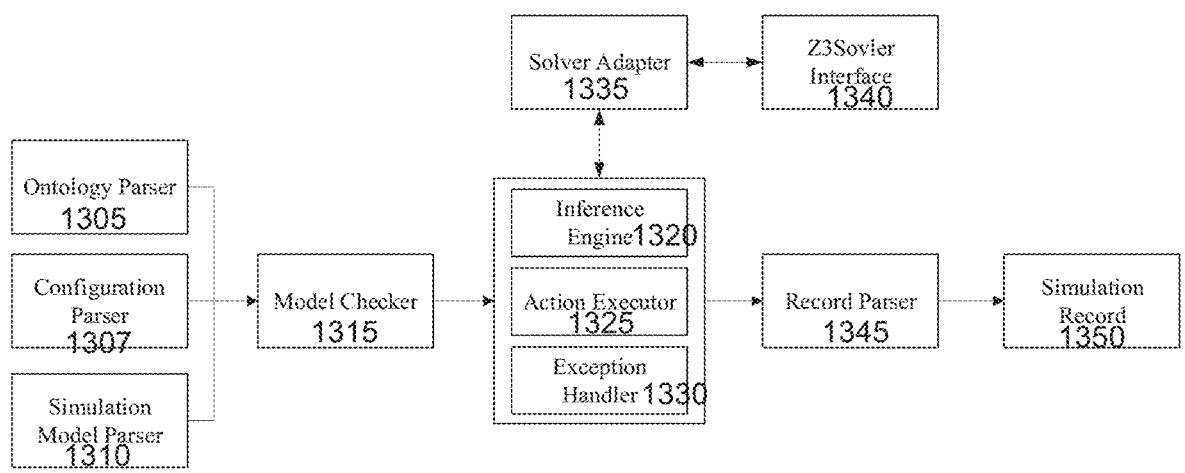
FIG. 13 is a diagram of an example simulation executor.

The simulation executor 1103 performs fault simulation and infers the states of functions during system operation. FIG. 13 is a diagram of an example simulation executor 1103. The simulation executor 1103 comprises three model parsers 1305, 1307, 1310, a model checker 1315, an inference engine 1320, an action executor 1325, an exception handler 1330, a solver adapter 1335 and solver interface 1340, and a record parser 1345 and simulation record 1350, as displayed by FIG. 13.

Similar to those in the fault generator 1102, model parsers in the simulation executor 1103 are used to integrate and translate the models of ontologies and configurations. Also, a simulation model parser 1310 is used which loads the dynamic information about the system elements, such as the initial states of each component and flow, the time, location, and fault types for fault injection during fault simulation. The combination of a specific configuration model and a simulation model describes a scenario.

The model checker 1315 has the same functionality as the one for the fault generator.

The action executor 1325 is the module that executes the actions under a state of an element. During the simulation, this module will generate the statements that express the behaviors of an element and monitor the changes of the related elements impacted by the execution. The action executor 1325 uses an action queue that caches the actions waiting for execution. The action queue will increase and decrease dynamically during the execution of the simulation. At the beginning of the simulation, the initial actions described by the initial states will be added into the action queues.

An action sequence is a sequential model including several actions and their relations in order. Action sequences are similar to activity diagrams provided by UML, which also describes the time order of the actions. For each action, describe its starting time, end time, and the continuity (continuous or discrete). For continuous actions, the behaviors will be executed at each time step. For discrete actions, additionally describe their period. Discrete actions will be performed at time steps separated by the period. For instance, the behaviors of physical components (e.g., pipes, valves) are continuous, which means that these components will keep acting over time. On the other hand, the sampling program for the inlet flow rate is a discrete component and requires a period to be described according to the desired sampling rate.

The exception handler 1330 is described to handle the exceptions possibly thrown during the simulation such as initialize, rule, time step, and execution exceptions.

The inference engine 1320 is in charge of parsing, storing, and solving the propositional statements generated by the simulation executor. In addition, the statement solver should be able to revert to a previous state.

The solver adapter 1335 and solver interfaces 1340 are also used to calculate the validity or satisfiability of statements. In practice, the triggering conditions and the statements of behavioral rules are represented by propositions in propositional logic. Therefore, inferring the states of components and functions can be seen as a propositional logic problem of inferring the validity or satisfiability of some logical expressions based on the propositional logics.

The record parser 1345 records the results of the inference and formats them into human readable format into one or more simulation records 1350.

The expressions of behaviors are the propositions that describe the relations between inputs and outputs of components or flows. Behavioral expressions usually comprise of an assignment expression and/or several operators and operands. In a behavioral expression, a variable usually appears in the following format:

[Component,Flow or Function]·[Input or Output]·
    [Inherent Variable]·[Time Label]

The first square bracket includes the name of a component or flow whose behavior is involved in this expression. The second bracket represents the input or output of such component or flow. Next is the variable belonging to the input or output. The last one is a time label which denotes the time step when the current behavior executes. The following is an example behavioral expression:

Pump_1·Out_Water·Flowrate·$t1$

During the fault simulation, the behavioral expressions are used to identify the states of components and functions. An example of one of these statements is below, which denotes the relation between the input and output flow rate of a normal pump.

Pump$_1$·Out$_{water}$·Pressure·$t1$=Pump1·In$_{Water}$·Pressure·$t0$*PUMP$^{RATIO}$ In this expression, "Pump_1" is the name of a component. "In_Water" and "Out_Water" are the instance of input and output flows, respectively. Although the name can be any unique string, the name may be chosen to clearly represent the actual characteristics of the described flow. Then, the label "Pressure" is an inherent variable of the water flow. The constant "PUMP_RATIO" denotes the compression ratio of the pump. According to the example expression, the output pressure of a normal pipe should equal its input pressure multiplied by a compression ratio.

The time label will vary at different time steps, but the relation between components and flows is fixed. Therefore, describe a time variation expression to represent the time relation between the variables of components or flows. Use the expression {[N]} for denoting the time relation. The expression {[0]} or {[·]} represents the current time step. The expression with a positive number, such as {[+1]}, means the time step after the current step with the number of steps. An expression with a negative number represents the time step that occurs before the current step with the number of steps. Hence the behavioral statement of the pump can be described as below Pump$_1$·Out$_{water}$·Pressure·
    {[+1]}=Pump$_1$·In$_{Water}$·Pressure·{[0]}*
    PUMP$_{RATIO}$ In this statement, the output pressure at the next time step depends on the input pressure at the current time step. During the fault simulation, the statement of the behaviors of the components and flows at each time step will be translated into several time related statements which are used as the evidence to infer the states of functions. For example, the statement above will be translated to the following statements.

Pump$_1$·Out$_{Water}$·Pressure·$t1$=Pump$_1$·In$_{Water}$·Pressure·$t0$*PUMP$_{RATIO}$ Pump$_1$·Out$_{Water}$·Pressure·$t2$=Pump$_1$·In$_{Water}$·Pressure·$t1$*PUMP$_{RATIO}$ Pump_1·Out_Water·Pressure·$t3$=Pump_1·In_Water·Pressure·$t2$*
    PUMP_RATIO Regarding interaction between hardware and software, in practice, software is a sequence of commands and data running on a processor. Therefore, the interactions between software and hardware can be represented by time-ordered commands and data transferred between the components of software programs and the components of processors. The provided framework uses a special component "interface" to denote these interactions. The component "interface" has three input ports: (1) the "command" port represents what actions the processor should perform, e.g. reading data from a memory unit; (2) the "address" port represents the address of the memory unit or the I/O devices; (3) the "data" port represents the data that corresponds to the "command". For example, if the "command" is for the processor to perform addition, then the "data" could be the actual values that need to be added. The interactions between software and hardware components in the computer system will be presented by the "interface" components sitting between software components and hardware processors.

Correspondingly, the component "interface" has its corresponding function "transection" which similarly includes three types of output ports: the "command" port, the "address" port, and the "data" port. These ports will finally connect to the same named ports of a processor component, transferring the corresponding information from the software component. In the ontology of the processor, several behaviors have been described for the predescribed command, such as reading a memory unit, sending data to an I/O port, etc.

Regarding workflow, at the initial stage of fault simulation, the ontologies and system configurations are read by specific parsers. Parsing the ontology files generates the cache of condition rules for state inference. Parsing the system configuration files can establish the structure trees of components and functions. These trees are accessed and traversed by an iterator, which will generate the rules for deducing the states of components and functions. Referring to the cached rules from ontologies, the rules of the state estimation are generated and transferred to the SMT solver by an adapter. The results of the solver are the final states of each component and their functions at the current time. The process of state inference will be completed at every time step. Finally, the results are formatted and stored in different output files.

Figure 14:
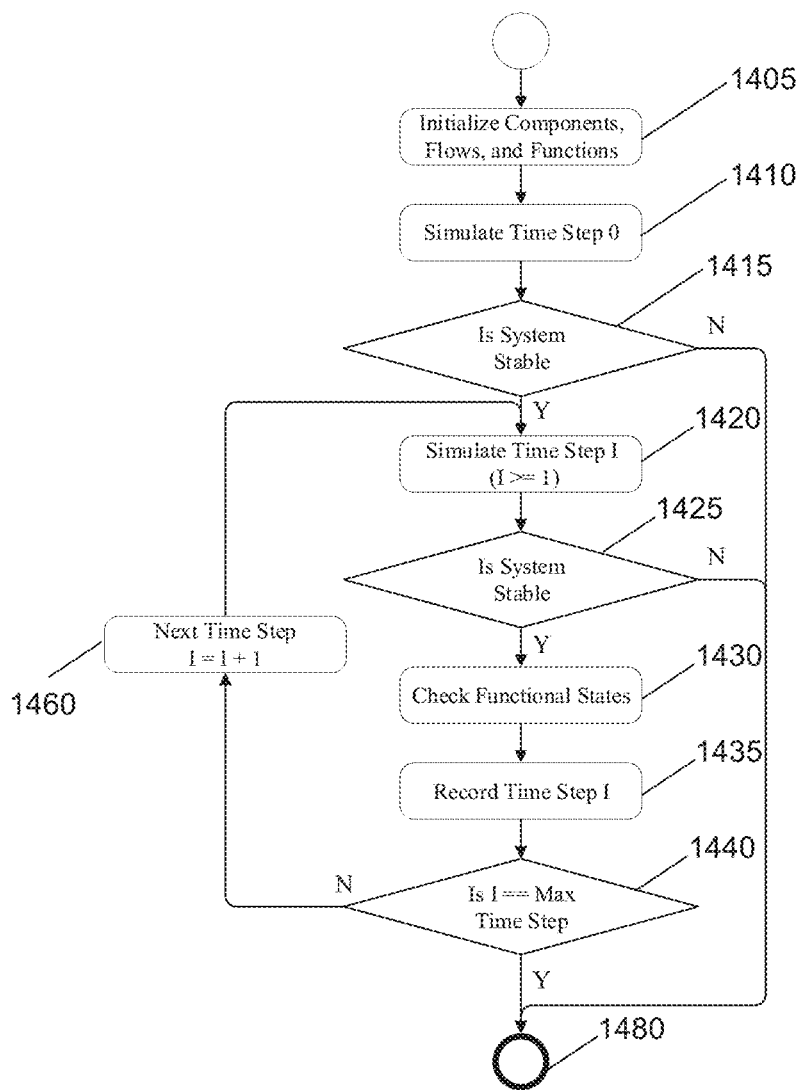
FIG. 14 is an operational flow of an implementation of a method of the simulator.

FIG. 14 is an operational flow of an implementation of a method 1400 of the simulator. With respect to FIG. 14, at 1405, the simulator (e.g., the fault analysis tool 1100) reads all the required model files and initializes the corresponding elements and event queues. In the element container, each component, flow, or function is encapsulated in an element. At the beginning, these elements are set to their default states. The components, flows, and functions are translated into elements in the simulation executor. These elements commonly include states with corresponding entrance conditions and behaviors. Each element records its states at each time step and generates statements of conditions and behaviors.

More particularly, at 1410, time step 0 is simulated. It is then determined at 1415 whether the system is stable or not. If the system is not stable, then processing concludes at 1480.

If the system is determined to be stable at 1415, then a simulation at the next time step (e.g., time step+1) is performed at 1420. It is then determined at 1425 whether the system is stable or not. If the system is not stable, then processing concludes at 1480.

If the system is determined to be stable at 1425, then at 1430, the functional states are checked as described further herein.

At 1435, the time step is recorded, and it is determined at 1440 whether the latest time step is the maximum time step (e.g., has a time step threshold been reached). If the maximum time step has been reached, then processing concludes at 1480. Otherwise, at 1460, the time step is incremented (by +1) and processing continues at 1420.

Regarding algorithms, for each time step of the simulation, a list of unexecuted components is used to cache the component whose behaviors have not been executed at the current time step. The behavior execution routine includes several steps, including getting the current state of the component, getting the behaviors of the component, solving the statements of the behaviors, and finally checking the state of the components related to the current component. The pseudo code of the algorithm is displayed in FIG. 15. Thus, FIG. 15 shows an implementation of an algorithm 1500 of simulation in time steps.

In the check related components routine mentioned above, the algorithm will iterate the inputs and outputs of the current component and identify the related components by checking the flows related to the inputs and outputs. When the related components are identified, the simulation tool will check the state of these components. This algorithm is shown in FIG. 16. Thus, FIG. 16 shows an implementation of an algorithm 1600 for checking states of related components.

FIG. 17 shows an implementation of an algorithm 1700 for checking and setting the state of a component. The algorithm will read the triggering conditions described in the state machine of the current component and check whether the condition is valid or not. If the condition is valid, then the state of the current component will be switched to the target state. After that, the algorithm will call the behavioral execution algorithm described with respect to FIG. 15 to execute the new behaviors.

When the components are executed, i.e., the list of unexecuted components is empty, the execution of the current time step will stop. Then, the simulation tool will identify the states of functions by checking the triggering conditions of each function iteratively. Finally, the simulation tool will call the record parser to permanently store the states of components, flows, and functions at the current time step. After the execution of the current time step, the time counter is increased by one and the execution of the next time step is started. The simulation will stop when the time counter reaches the maximum time step described by the test scenario.

A case study was performed using the proposed method used a model with 34 components and 46 flows to verify 20 functions and sub-functions of the system at the early design stage. The framework generated 1467 faults based on the ontological concepts. Examples of faults were analyzed and 98% of faults' impacts were clearly predicted (missing were the scenarios with "uncertain" outcomes). The result proves that the proposed method can effectively generate faults and their propagation paths, which is useful for improving the robustness of the system.

In addition, the proposed method was used to verify the effectiveness of two potential improvements of the system design. The simulation results proved that the effectiveness of a system improvement strategy depends on the type of components (e.g., software or hardware) and the type of faults (e.g., additional inputs, missing outputs). By analyzing the simulation results, system developers can effectively select system improvement strategies when trying to increase system robustness by tolerating certain types of faults occurring at certain types of components. For instance, based on the results gathered for the case study system, a strategy combining duplication and validity verification can be specified to further optimize the system design with respect to fault tolerance.

Thus, systems and methods are described herein for generating faults and analyzing fault propagation and its effects. Starting from the ontologies of components, functions, flows, and faults, systems and methods are provided that describe and track faults in a computer system across multiple domains throughout design, development, or a combination thereof. In order to construct the system and fault models, a series of concepts is introduced in the form of ontologies and their dependencies. An investigation is performed into the faults, including their type, cause, lifecycle aspects, and effect. Principles and rules are created to generate various faults based on system configurations. After the modeling process, a simulation engine is described to execute actions and simulate the process of fault generation and propagation. As a result, fault paths that impact components and functions can be obtained.

Gathering fault propagation paths at an early design phase significantly helps to predict and improve the reliability and safety of a system. First, the paths provide intuitive evidence for fault detection and diagnosis. Second, fault prevention mechanisms and redundancy policies can be applied to the most frequently traversed nodes in order to efficiently implement fault masking and isolation. Also, the fault propagation paths are helpful for generating test cases for system verification since they provide useful information on triggering faults that are possibly hiding in the system under analysis.

FIG. 18 shows an exemplary computing environment in which example embodiments and aspects may be implemented. The computing device environment is only one example of a suitable computing environment and is not intended to suggest any limitation as to the scope of use or functionality.

Numerous other general or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 18, an exemplary system for implementing aspects described herein includes a computing device, such as computing device 1800. In its most basic configuration, computing device 1800 typically includes at least one processing unit 1802 and memory 1804. Depending on the exact configuration and type of computing device, memory 1804 may be volatile (such as random access memory (RAM)), non-volatile (such as read-only memory (ROM), flash memory, etc.), or some combination of the two. This most basic configuration is illustrated in FIG. 18 by dashed line 1806.

Computing device 1800 may have additional features/functionality. For example, computing device 1800 may include additional storage (removable and/or non-removable) including, but not limited to, magnetic or optical disks or tape. Such additional storage is illustrated in FIG. 18 by removable storage 1808 and non-removable storage 1810.

Computing device 1800 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1804, removable storage 1808, and non-removable storage 1810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1800. Any such computer storage media may be part of computing device 1800.

Computing device 1800 may include communication connection(s) 1812 that allow the device to communicate with other devices. Computing device 1800 may also have input device(s) 1814 such as a keyboard, mouse, pen, voice input device, touch input device, etc. Output device(s) 1816 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a method for generating a fault is provided and comprises creating a knowledge base comprising at least one of components, flows, or functions; creating a system model using ontological concepts of at least one of components, flows, or functions; and generating at least one system model with at least one fault by applying fault generation principles to the system model.

Implementations may include some or all of the following features. The knowledge base comprises a plurality of components, flows, and functions. The method further comprises at least one of generating fault propagation paths by simulating a system of the system model or enriching at least one of the knowledge base or the fault generation principles when a new type of component, flow, or function or a new type of fault is observed on a system. The knowledge base is a repository comprising predescribed high-level and low-level ontologies of the at least one of components, flows, functions, or faults. The ontological concepts are configured to provide a capability of retrieving and reusing experiential data. The system model is a formal representation of the system. The fault generation principles are criteria for generating the at least one fault. The at least one system model with the at least one fault is a system configuration with initial states of components and flows.

In an implementation, a system for analyzing fault propagation is provided and comprises a knowledge base; and a fault analysis tool implemented using a computing device, wherein the fault analysis tool is configured to receive inputs comprising a plurality of ontologies from the knowledge base, and a system configuration, and wherein the fault analysis tool is further configured to provide outputs comprising at least one fault generation result and at least one analysis result.

Implementations may include some or all of the following features. The ontologies provide the basic elements of components and functions, including the states of components and functions, and the properties of components and flows. The knowledge base comprises concepts of at least one of components, flows, or functions described by the ontologies. The knowledge base is a repository comprising predefined high-level and low-level ontologies of at least one of components, flows, functions, or faults. The fault analysis tool comprises a fault generator and a simulation executor. The fault generator is a model-based tool that generates system configurations with injected faults from an original configuration, based on fault generation principles and fault ontologies. The simulation executor is configured to perform fault simulation and infer the states of functions during system operation. The at least one fault generation result comprises a system configuration with faults. The at least one analysis result comprises a fault propagation path.

In an implementation, a fault analysis tool is provided and comprises a fault generator configured to generate system configurations with injected faults from an original configuration, based on fault generation principles and fault ontologies; and a simulation executor configured to perform fault simulation and infer the states of functions during system operation.

Implementations may include some or all of the following features. The fault generator comprises an ontology parser, a configuration parser, a model checker, an inference engine, a principle iterator, an exception handler, a solver adapter, and a solver interface. The simulation executor comprises a plurality of model parsers, a model checker, an inference engine, an action executor, an exception handler, a solver adapter, a solver interface, and a record parser.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter described in the appended claims is not necessarily limited to the specific features or acts described above. Rather, the specific features and acts described above are disclosed as example forms of implementing the claims.

What is claimed:

1. A method for fault analysis of computer systems at a design stage prior to the computer system implementation, the method comprising:
    creating a knowledge base of computer systems, comprising a plurality of components, flows, and functions, and their attributes and their relations;
    creating a system model based on the knowledge base of the computer systems, the system model comprising component models using components of the knowledge base, models using flows of the knowledge base, and functional models using functions of the knowledge base, and their relations;
    creating fault ontology with properties comprising host entity, fault origin, phase of introduction, domain, occurrence, fault category, effects, and impact direction;
    generating faults in the system model of the computer systems by assigning values to the properties of a fault that satisfy the constraints for the created system model on the attributes of components, flows, and functions; and
    analyzing the computer systems based on the system model and the generated faults therein to infer operating states of the plurality of functions and components of the computer systems.

2. The method of claim 1, further comprising at least one of generating fault propagation paths by simulating a system of the system model or enriching at least one of the knowledge base or fault generation principles when a new type of component, flow, or function or a new type of fault is observed on a system.

3. The method of claim 1, wherein the knowledge base is a repository comprising predescribed high-level and low-level ontologies of at least one of components, flows, functions, or faults.

4. The method of claim 1, wherein the system model is a formal representation of the system.

5. The method of claim 1, wherein the generating faults in the system model comprises applying fault generation principles comprising at least one of: a missing property, an additional property, or an incorrect property.

6. A system for analyzing fault propagation, the system comprising:
    at least one computing device;
    a knowledge base of computer systems, comprising a plurality of components, flows, and functions, and their attributes and their relations;
    a fault analysis tool implemented using the at least one computing device; and
    a memory storing instructions that when executed by the at least one computing device cause the at least one computing device to receive, at the fault analysis tool, inputs comprising a plurality of ontologies from the knowledge base, and a system model based on the knowledge base of the computer systems, the system model comprising component models using components of the knowledge base, models using flows of the knowledge base, and functional models using functions of the knowledge base, and their relations, and wherein the fault analysis tool is configured to provide outputs comprising faults in the system model of the computer systems by assigning values to properties of a fault that satisfy the constraints for the created system model on the attributes of components, flows, and functions, wherein the properties are described in a fault ontology and comprise host entity, fault origin, phase of introduction, domain, occurrence, fault category, effects, and impact direction.

7. The system of claim 6, wherein the ontologies provide the basic elements of components and functions, including the states of components and functions, and the properties of components and flows.

8. The system of claim 6, wherein the knowledge base is a repository comprising predefined high-level and low-level ontologies of at least one of components, flows, functions, or faults.

9. The system of claim 6, wherein the fault analysis tool comprises a fault generator and a simulation executor.

10. The system of claim 9, wherein the fault generator is a model-based tool that generates system configurations with injected faults from an original configuration, based on fault generation principles and fault ontologies.

11. The system of claim 9, wherein the simulation executor is configured to perform fault simulation and infer the states of functions during system operation.

12. The system of claim 6, wherein the fault analysis tool is further configured to provide at least one fault generation result that comprises a system configuration with faults.

13. A fault analysis tool comprising:
    at least one computing device; and
    a memory storing instructions that when executed by the at least one computing device cause the at least one computing device to:
    generate, at a fault generator of a fault analysis tool, a system model based on a knowledge base of computer systems, the system model comprising component models using components of the knowledge base, models using flows of the knowledge base, and functional models using functions of the knowledge base, and their relations, wherein the knowledge base comprises a plurality of components, flows, and functions, and their attributes and their relations; and
    perform, at a simulation executor of the fault analysis tool, fault simulation and infer the states of functions during system operation and to provide outputs comprising faults in the system model of the computer systems by assigning values to properties of a fault that satisfy the constraints for the created system model on the attributes of components, flows, and functions, wherein the properties are described in a fault ontology and comprise host entity, fault origin, phase of introduction, domain, occurrence, fault category, effects, and impact direction.

14. The fault analysis tool of claim 13, wherein the fault generator comprises an ontology parser, a configuration parser, a model checker, an inference engine, a principle iterator, an exception handler, a solver adapter, and a solver interface.

15. The fault analysis tool of claim 13, wherein the simulation executor comprises a plurality of model parsers, a model checker, an inference engine, an action executor, an exception handler, a solver adapter, a solver interface, and a record parser.

16. The fault analysis tool of claim 15, wherein the inference engine is configured to:
- trigger conditions and statements of behavioral rules and function failure logic that are represented by propositions in propositional logic, the behavioral rules characterizing behaviors of the components and the flows in terms of inputs and outputs, the functional failure logic characterizing behaviors of functions and flows in terms of inputs and outputs; and
- infer the states of components and functions as a solution to a propositional logic problem of validity or satisfiability for the propositions.

* * * * *